US011966792B2

(12) United States Patent
Chen

(10) Patent No.: US 11,966,792 B2
(45) Date of Patent: Apr. 23, 2024

(54) RESOURCE PROCESSING METHOD OF CLOUD PLATFORM, RELATED DEVICE, AND STORAGE MEDIUM

(71) Applicant: Tencent Technology (Shenzhen) Company Limited, Shenzhen (CN)

(72) Inventor: Xinquan Chen, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 341 days.

(21) Appl. No.: 17/159,083

(22) Filed: Jan. 26, 2021

(65) Prior Publication Data

US 2021/0149743 A1 May 20, 2021

Related U.S. Application Data

(63) Continuation of application No. PCT/CN2020/100968, filed on Jul. 9, 2020.

(30) Foreign Application Priority Data

Jul. 22, 2019 (CN) ......................... 201910663032.2

(51) Int. Cl.
*G06F 9/50* (2006.01)

(52) U.S. Cl.
CPC ............ *G06F 9/5077* (2013.01); *G06F 9/505* (2013.01); *G06F 9/5072* (2013.01);
(Continued)

(58) Field of Classification Search
CPC ...... G06F 9/5077; G06F 9/505; G06F 9/5072; G06F 9/5083; G06F 2209/5022;
(Continued)

(56) References Cited

U.S. PATENT DOCUMENTS

2015/0281316 A1 10/2015 Bragstad et al.
2017/0060642 A1 3/2017 Castellano
(Continued)

FOREIGN PATENT DOCUMENTS

CN 106293871 A 1/2017
CN 106325998 A 1/2017
(Continued)

OTHER PUBLICATIONS

Tencent Technology, WO, PCT/CN2020/100968, Sep. 28, 2020, 5 pgs.

(Continued)

*Primary Examiner* — Sisley N Kim
(74) *Attorney, Agent, or Firm* — Morgan, Lewis & Bockius LLP

(57) ABSTRACT

Embodiments of the present disclosure provide a resource processing method of a cloud platform and a related computing device. The cloud platform includes a plurality of nodes, and each node includes a first resource and a second resource. The method is performed by the computing device and/or a host manager in the cloud platform, and includes: obtaining a current first resource allocation ratio and a current second resource allocation ratio of each of the plurality of nodes; obtaining a first resource limit and a second resource limit that are required by a newly added host; determining, among the plurality of modes, a target node according to the current first resource allocation ratio and the current second resource allocation ratio of each node, the first resource limit, and the second resource limit; and deploying the newly added host in the target node.

20 Claims, 11 Drawing Sheets

100

103

102

104

105

101

(52) U.S. Cl.
CPC .... *G06F 9/5083* (2013.01); *G06F 2209/5022* (2013.01); *G06F 2209/503* (2013.01)

(58) Field of Classification Search
CPC ............. G06F 2209/503; G06F 9/5027; H04L 67/1008; H04L 67/1012
See application file for complete search history.

(56) References Cited

U.S. PATENT DOCUMENTS

| | | | |
|---|---|---|---|
| 2017/0374145 A1 | 12/2017 | Chrysanthakopoulos et al. | |
| 2019/0042321 A1* | 2/2019 | Venkatesh | G06F 9/45558 |
| 2020/0151018 A1* | 5/2020 | Jha | G06F 9/4856 |
| 2020/0356402 A1* | 11/2020 | Zhang | G06F 9/5077 |

FOREIGN PATENT DOCUMENTS

| | | |
|---|---|---|
| CN | 106874116 A | 6/2017 |
| CN | 106909462 A | 6/2017 |
| CN | 106919435 A | 7/2017 |
| CN | 108170517 A | 6/2018 |
| CN | 109213555 A | 1/2019 |
| CN | 109254843 A | 1/2019 |
| CN | 109471725 A | 3/2019 |
| CN | 109753356 A | 5/2019 |
| CN | 110474966 A | 11/2019 |
| CN | 110493317 A | 11/2019 |

OTHER PUBLICATIONS

Tencent Technology, IPRP, PCT/CN2020/100968, Jan. 25, 2022, 6 pgs.

Tencent Technology, ISR, PCT/CN2020/100968, Sep. 28, 2020, 3 pgs.

Zhe Jiang, "*Research on Resource Prediction and Allocation of Video Surveillance Cloud Platform Based on Docker*," Chinese Master's Dissertations Full-text Database, Information Science and Technology, No. 03, Mar. 15, 2018, ISSN: 1674-0246, pp. 31-44.

* cited by examiner

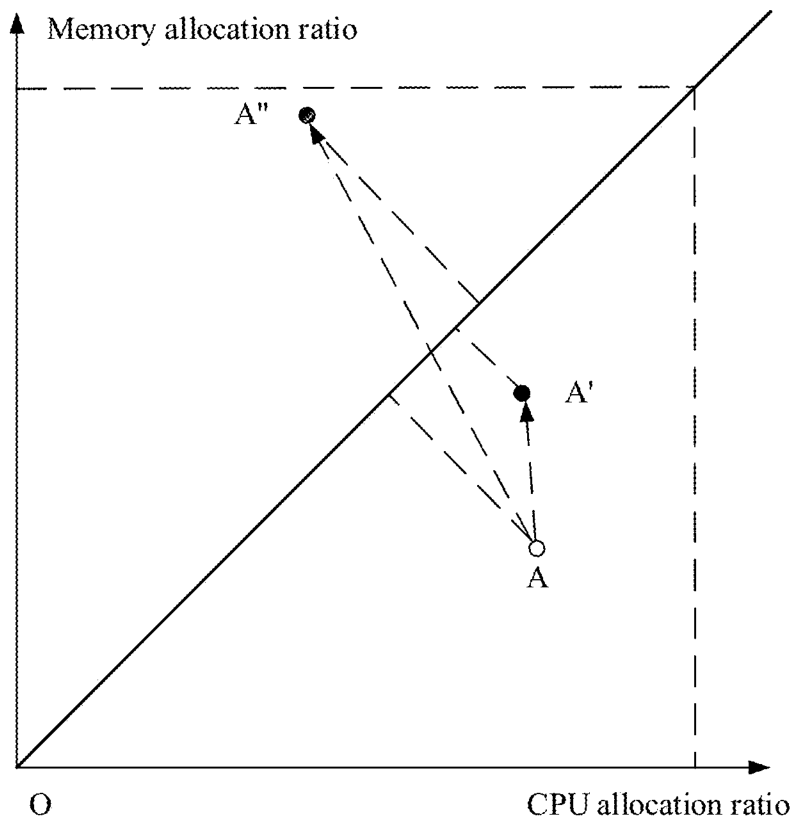

FIG. 7

Determine, according to the current first resource allocation ratio and the current second resource allocation ratio of each node, whether the node is currently in a resource balanced state, a first resource unbalanced state, or a second resource unbalanced state

S810

Migrate a stock host from a node in the first resource unbalanced state that causes first resource allocation imbalance to a node in the second resource unbalanced state or the resource balanced state

RESOURCE PROCESSING METHOD OF CLOUD PLATFORM, RELATED DEVICE, AND STORAGE MEDIUM

CROSS REFERENCE TO RELATED APPLICATIONS

This application is a continuation application of PCT Patent Application No. PCT/CN2020/100968, entitled "RESOURCE PROCESSING METHOD OF CLOUD PLATFORM, RELATED DEVICE, AND STORAGE MEDIUM" filed on Jul. 9, 2020, which claims priority to Chinese Patent Application No. 201910663032.2, filed with the State Intellectual Property Office of the People's Republic of China on Jul. 22, 2019, and entitled "METHOD FOR PROCESSING CLOUD PLATFORM RESOURCE FRAGMENT AND RELATED DEVICE", all of which are incorporated herein by reference in their entirety.

FIELD OF THE TECHNOLOGY

The present disclosure relates to the field of computers and communication technologies, and specifically, to a resource processing method of a cloud platform, a related device, and a storage medium.

BACKGROUND OF THE DISCLOSURE

With the development of networks, the artificial intelligence cloud platform supporting big data computation is used increasingly widely. For example, the artificial intelligence cloud platform can provide running resources, for example, a graphics processing unit (GPU) computing resource, for a plurality of operations simultaneously.

However, if resource allocation in the cloud platform is unbalanced, a relatively large quantity of resource fragments may be generated, resulting in that remaining resources cannot be allocated, and the resource utilization rate is reduced.

Therefore, a new resource processing method of a cloud platform is required to reduce resource fragments generated in the cloud platform and improve the resource utilization rate.

The information disclosed in BACKGROUND OF THE DISCLOSURE is merely used for enhancing the understanding of the background of the present disclosure, and therefore, may include information that does not constitute the related art known to a person of ordinary skill in the art.

SUMMARY

An embodiment of the present disclosure provides a resource processing method of a cloud platform, the cloud platform including a plurality of nodes, each node including a first resource and a second resource different from the first resource, the method being performed by a computing device and/or a host manager in the cloud platform, and the method including: obtaining a current first resource allocation ratio and a current second resource allocation ratio of each of the plurality of nodes; obtaining a first resource limit and a second resource limit that are required by a newly added host; determining, among the plurality of modes, a target node according to the current first resource allocation ratio and the current second resource allocation ratio of each node, the first resource limit, and the second resource limit; and deploying the newly added host in the target node.

An embodiment of the present disclosure provides a resource processing apparatus of a cloud platform, the cloud platform including a plurality of nodes, each node including a first resource and a second resource different from the first resource, and the apparatus including: a current-resource-allocation-ratio obtaining unit, configured to obtain a current first resource allocation ratio and a current second resource allocation ratio of each of the plurality of nodes; a newly-added-resource-limit obtaining unit, configured to obtain a first resource limit and a second resource limit that are required by a newly added host; a target-node determining unit, configured to determine, among the plurality of modes, a target node according to the current first resource allocation ratio and the current second resource allocation ratio of each node, the first resource limit, and the second resource limit; and a newly-added-host deployment unit, configured to deploy the newly added host in the target node.

An embodiment of the present disclosure further provides a non-transitory computer-readable storage medium, storing a plurality of computer programs that, when executed by a processor of a computing device, implementing the resource processing method of a cloud platform according to the foregoing embodiments.

An embodiment of the present disclosure further provides an electronic device, including one or more processors; and a storage apparatus, configured to store one or more programs, the one or more programs, when executed by the one or more processors, causing the one or more processors to implement the resource processing method of a cloud platform according to the foregoing embodiments.

BRIEF DESCRIPTION OF THE DRAWINGS

The accompanying drawings herein are incorporated into the specification and constitute a part of this specification, show embodiments that conform to the present disclosure, and are used for describing the principle of the present disclosure together with the specification. Apparently, the accompanying drawings in the following descriptions show merely some embodiments of the present disclosure, and a person of ordinary skill in the art may still derive other drawings from these accompanying drawings without creative efforts. In the accompanying drawings:

FIG. 7 is a schematic diagram of a precautionary resource allocation policy according to an embodiment of the present disclosure.

FIG. 8 is a schematic flowchart of a method for processing a cloud platform resource fragment according to another embodiment of the present disclosure.

DESCRIPTION OF EMBODIMENTS

Exemplary implementations are described more comprehensively below with reference to the accompanying drawings. However, the exemplary implementations may be implemented in a plurality of forms, and are not to be understood as being limited to the examples described herein. Conversely, the implementations are provided to make the present disclosure more comprehensive and complete, and comprehensively convey the concept of the exemplary implementations to a person skilled in the art.

In addition, the described features, structures, or characteristics may be combined in one or more embodiments in any appropriate manner. In the following descriptions, a lot of specific details are provided to give a comprehensive understanding of the embodiments of the present disclosure. However, a person skilled in the art is to be aware that, the technical solutions of the present disclosure may be implemented without one or more specific details, or another method, component, apparatus, step, and the like may be used. In other cases, well-known methods, apparatuses, implementations, or operations are not shown or described in detail to avoid obscuring aspects of the present disclosure.

The block diagrams shown in the accompanying drawings are merely functional entities, and do not necessarily correspond to physically independent entities. That is, the functional entities may be implemented in a software form, or in one or more hardware modules or integrated circuits, or in different networks and/or processor apparatuses and/or microcontroller apparatuses.

The flowcharts shown in the accompanying drawings are merely exemplary descriptions, do not need to include all content and operations/steps, and do not need to be performed in the described orders either. For example, some operations/steps may be further divided, while some operations/steps may be combined or partially combined. Therefore, an actual execution order may change according to an actual case.

Figure 1:
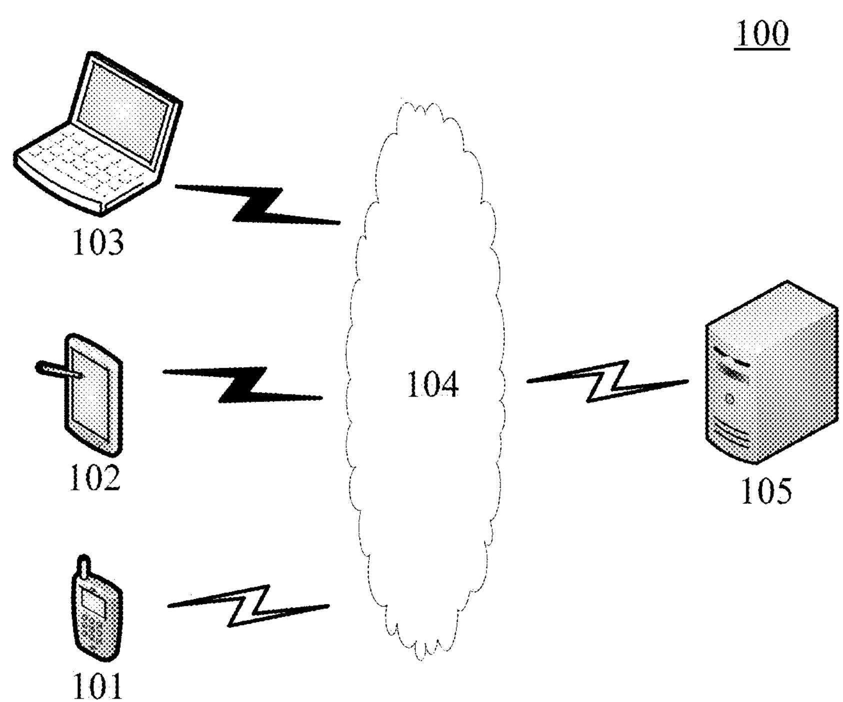
FIG. 1 is a schematic diagram of an exemplary system architecture to which a method for processing a cloud platform resource fragment or an apparatus for processing a cloud platform resource fragment according to an embodiment of the present disclosure may be applied.

FIG. 1 is a schematic diagram of an exemplary system architecture 100 to which a method for processing a cloud platform resource fragment or an apparatus for processing a cloud platform resource fragment according to an embodiment of the present disclosure may be applied.

As shown in FIG. 1, the system architecture 100 may include one or more of terminal devices 101, 102, and 103, a network 104, and a server 105. The network 104 is a medium configured to provide communication links between the terminal devices 101, 102, and 103, and the server 105. The network 104 may include various connection types, for example, a wired or wireless communication link, or an optical fiber cable.

It is to be understood that the quantity of terminal devices, the quantity of networks, and the quantity of servers in FIG. 1 are merely illustrative. There may be any quantity of terminal devices, any quantity of networks, and any quantity of servers according to an implementation requirement. For example, the server 105 may be a server cluster including a plurality of servers or the like.

A user may interact with the server 105 through the network 104 by using the terminal devices 101, 102, and 103, to receive or send messages. The terminal devices 101, 102, and 103 may be various electronic devices having display screens, including, but not limited to, smartphones, tablet computers, portable computers, desktop computers, digital cinema projectors, and the like.

The server 105 may be a server providing various services. For example, the user sends various requests to the server 105 by using the terminal device 103 (or the terminal device 101 or 102). The server 105 may obtain, based on related information carried in the request, feedback information in response to the request, and return the feedback information to the terminal device 103, so that the user can view the displayed feedback information on the terminal device 103.

In another example, the terminal device 103 (or the terminal device 101 or 102) may be a smart TV, a virtual reality (VR)/augmented reality (AR) helmet-mounted display, or a mobile terminal, such as a smartphone or a tablet computer, on which an instant messaging or video application (APP) is installed. The user may send various requests to the server 105 by using the smart TV, the VR/AR helmet-mounted display, or the instant messaging or video APP. The server 105 may obtain, based on the request, feedback information in response to the request, and return the feedback information to the smart TV, the VR/AR helmet-mounted display, or the instant messaging or video APP, to display the returned feedback information by using the smart TV, the VR/AR helmet-mounted display, or the instant messaging or video APP.

Figure 2:
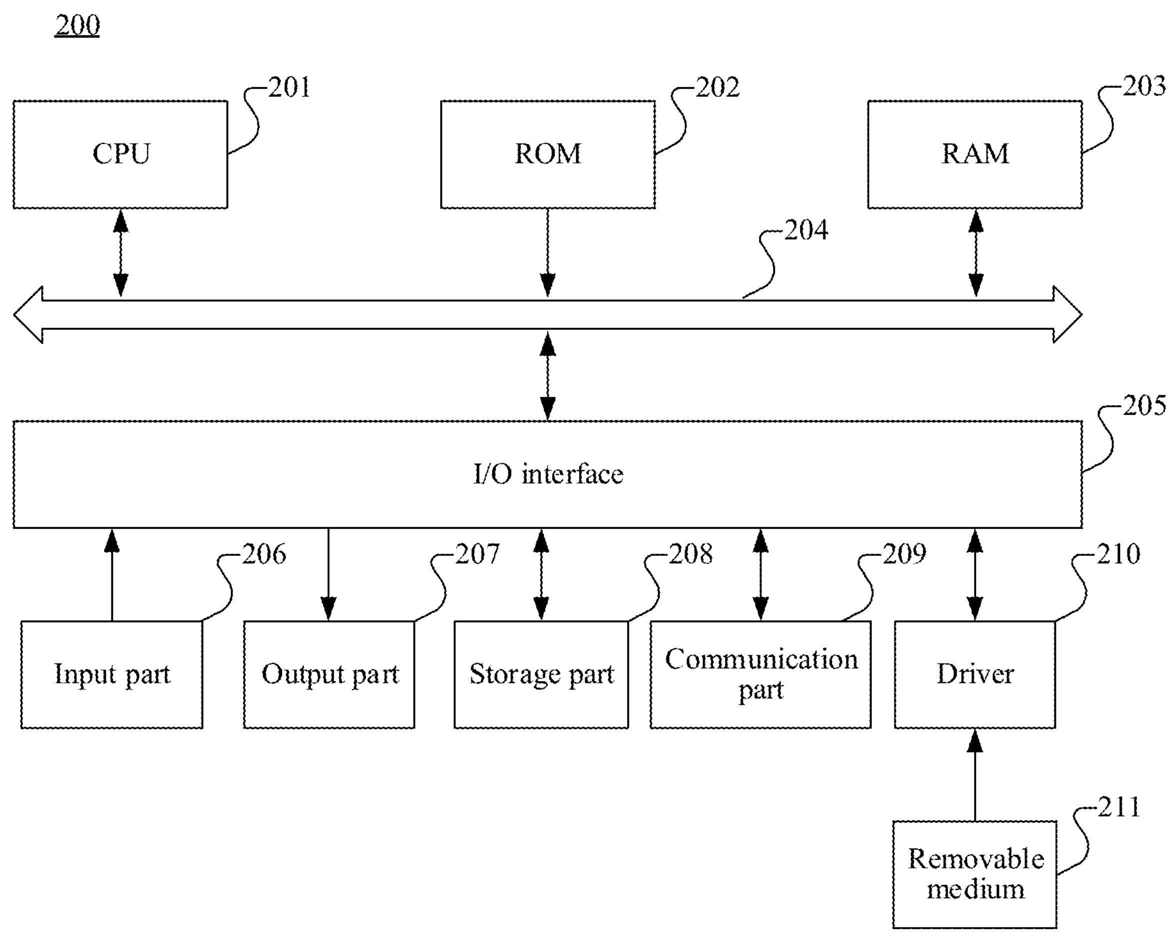
FIG. 2 is a schematic structural diagram of a computer system adapted for implementing an electronic device according to an embodiment of the present disclosure.

FIG. 2 is a schematic structural diagram of a computer system adapted for implementing an electronic device according to an embodiment of the present disclosure.

A computer system 200 of the electronic device shown in FIG. 2 is merely an example, and is not to be construed as any limitation on the function and application scope of the embodiments of the present disclosure.

As shown in FIG. 2, the computer system 200 includes a central processing unit (CPU) 201. The CPU can perform various proper actions and processing according to a program stored in a read-only memory (ROM) 202 or a program loaded from a storage part 208 into a random access memory (RAM) 203. The RAM 203 further stores various programs and data required for operating the system. The CPU 201, the ROM 202, and the RAM 203 are connected to each other through a bus 204. An input/output (I/O) interface 205 is also connected to the bus 204.

The following parts are connected to the I/O interface 205: an input part 206 including a keyboard, a mouse, and the like; an output part 207 including a cathode ray tube (CRT), a liquid crystal display (LCD), or the like, a speaker and the like; a storage part 208 including a hard disk and the like; and a communication part 209 including a network interface card such as a local area network (LAN) card, a modem, or the like. The communication part 209 performs communication processing through a network such as the Internet. A drive 210 is also connected to the I/O interface 205 as required. A removable medium 211, such as a magnetic disk, an optical disc, a magneto-optical disk, or a semiconductor memory, is installed on the drive 210 as required, so that a computer program read from the removable medium is installed into the storage part 208 as required.

Particularly, according to an embodiment of the present disclosure, the processes described below by referring to the flowcharts may be implemented as computer software programs. For example, an embodiment of the present disclosure includes a computer program product, including a computer program carried on a computer-readable storage medium. The computer program includes program code for performing the method shown in the flowchart. In such an embodiment, by using the communication part 209, the computer program may be downloaded and installed from a network, and/or be installed from the removable medium 211. When the computer program is executed by the CPU 201, the various functions defined in the method and/or apparatus of this application are executed.

The computer-readable medium shown in the present disclosure may be a computer-readable signal medium, a computer-readable storage medium, or any combination thereof. The computer-readable storage medium may be, but is not limited to, for example, an electrical, magnetic, optical, electromagnetic, infrared, or semiconductor system, apparatus, or device, or any combination thereof. More specific examples of the computer-readable storage medium may include, but are not limited to, an electrical connection having one or more wires, a portable computer magnetic disk, a hard disk, a RAM, a ROM, an erasable programmable read-only memory (EPROM) (or flash memory), an optical fiber, a compact disk read-only memory (CD-ROM), an optical storage device, a magnetic storage device, or any appropriate combination thereof. In the present disclosure, the computer-readable storage medium may be any tangible medium including or storing a program, and the program may be used by or in combination with an instruction execution system, apparatus, or device. In the present disclosure, the computer-readable signal medium may include a data signal included in a baseband or propagated as a part of a carrier, the data signal carrying computer-readable program code. The propagated data signal may be in a plurality of forms, including, but not limited to, an electromagnetic signal, an optical signal, or any appropriate combination thereof. The computer-readable signal medium may alternatively be any computer-readable medium other than the computer-readable storage medium. The computer-readable medium may send, propagate, or transmit a program used by or in combination with an instruction execution system, apparatus, or device. The program code contained in the computer-readable storage medium may be transmitted by using any appropriate medium, including but not limited to: a wireless medium, a wire, an optical cable, a radio frequency (RF) medium, or any appropriate combination thereof.

The flowcharts and block diagrams in the accompanying drawings show architectures, functions, and operations that may be implemented by using the method, the apparatus, and the computer program product according to the embodiments of the present disclosure. In this regard, each block in the flowchart or the block diagram may represent a module, a program segment, or a part of code. The module, the program segment, or the part of code includes one or more executable instructions for implementing specified logic functions. In some alternative implementations, functions annotated in the blocks may alternatively occur in a sequence different from that annotated in the accompanying drawings. For example, actually, two blocks shown in succession may be performed basically concurrently, and sometimes, the two blocks may alternatively be performed in a reverse sequence. This is determined by related functions. Each block in the block diagram or the flowchart, and a combination of blocks in the block diagram or the flowchart may be implemented by using a dedicated hardware-based system that performs a specified function or operation, or may be implemented by using a combination of dedicated hardware and computer instructions.

The involved units described in the embodiments of the present disclosure may be implemented in a software manner, or may be implemented in a hardware manner, and the described units may also be disposed in a processor. Names of the units do not constitute a limitation on the units in a specific case.

According to another aspect, this application further provides a computer-readable storage medium. The computer-readable storage medium may be included in the electronic device described in the foregoing embodiments, or may exist alone and be not assembled in the electronic device. The computer-readable storage medium carries one or more programs, the one or more programs, when executed by the electronic device, causing the electronic device to implement the method described in the following embodiments. For example, the electronic device may implement steps shown in FIG. 3, FIG. 4, FIG. 5, FIG. 6, FIG. 8, FIG. 11, FIG. 12, FIG. 13, or FIG. 15.

In the related art, manners of preventing a problem of resource fragment generation on a cloud platform mainly include two types: 1. preference for idleness, that is, a newly added host is preferentially deployed in a currently idlest node on the cloud platform; 2. preference for saturation, that is, a newly added host is preferentially deployed in a node on the cloud platform to saturate the node.

Figure 3:
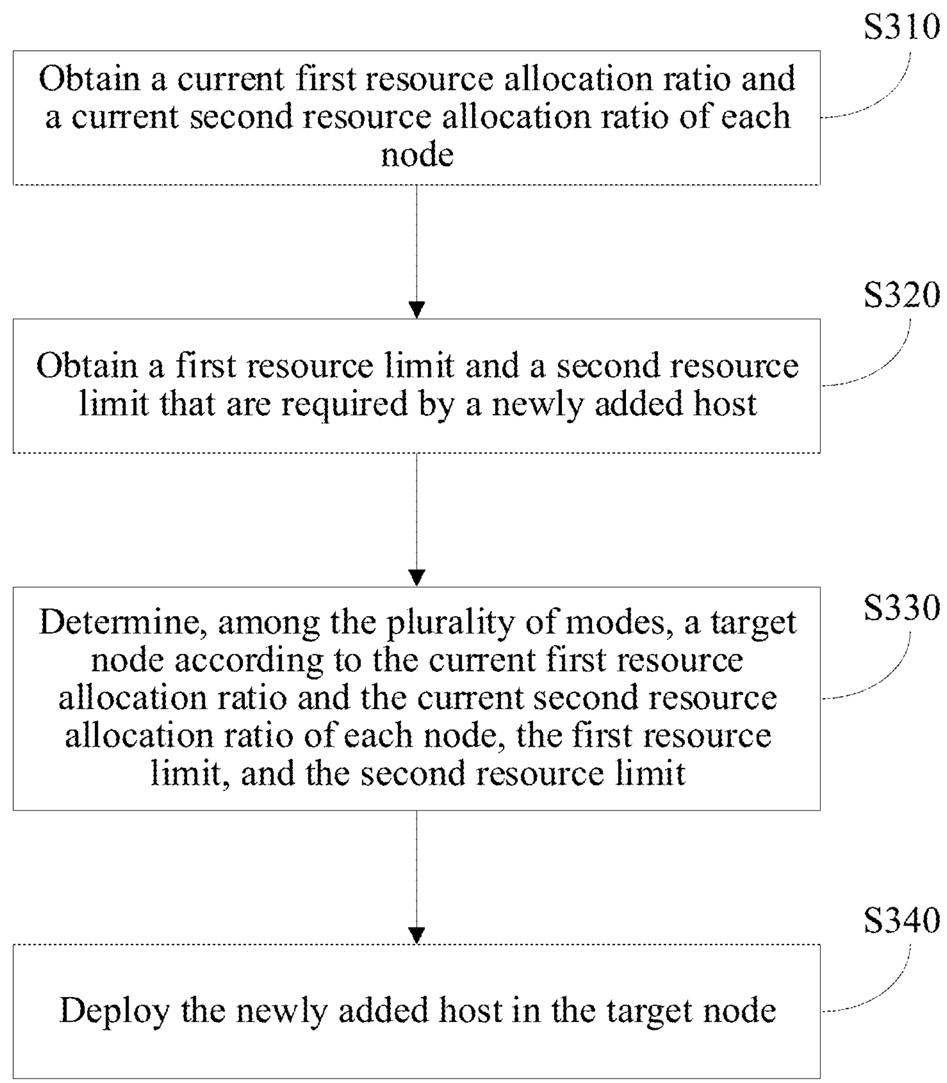
FIG. 3 is a schematic flowchart of a method for processing a cloud platform resource fragment according to an embodiment of the present disclosure.

FIG. 3 is a schematic flowchart of a method for processing a cloud platform resource fragment according to an embodiment of the present disclosure.

In this embodiment of the present disclosure, the cloud platform may include a plurality of nodes (also referred to as host machines herein). If the newly added host is a container, each node may be a physical machine (for example, a server) used as a host machine, or may be a virtual machine used as a host machine. The container is a lightweight, portable, and self-contained software packaging technology that enables application programs to be run almost anywhere in the same manner. If the newly added host is a virtual machine, each node may be a physical machine used as a host machine. The host machine is a physical machine or a virtual machine on which a container is deployed, or a physical machine on which a virtual machine is deployed. A plurality of containers or a plurality of virtual machines may be deployed on one host machine. The cloud platform includes a large quantity of host machines.

Each node may include a first resource and a second resource, but the present disclosure is not limited thereto. Each node may further include, for example, various resources such as a third resource and a fourth resource. The various resources may include a computing resource (for example, a CPU or a GPU), a storage resource (for example, a memory, a RAM, a ROM, or a magnetic disk), and the like. In the following exemplary descriptions, descriptions are provided by using an example in which the first resource is a CPU and the second resource is a memory. However, a person skilled in the art may understand that the technical solutions provided in the embodiments of the present disclosure may be applied to any other resource types, and may further be extended to three or more types of resources.

In this embodiment of the present disclosure, the cloud platform may further include a computing device and a host manager. The computing device and/or the host manager may be configured to perform the method provided in this embodiment of the present disclosure. For example, the computing device receives a request for creating a newly added host and selects a target node as a host machine of the newly added host in response to the request, and then the host manager selects a specific target node to perform a creation operation.

In this embodiment of the present disclosure, due to improper deployment of the containers or the virtual machines, resources, such as the CPU resource or the memory resource in a host machine cannot be allocated to other containers or virtual machines any more, and the resources that cannot be allocated are resource fragments. Resource balance refers to that the host machine has relatively few resource fragments. If allocation ratios of various resources, for example, a CPU allocation ratio and a memory allocation ratio, are not much different, resource balance is implemented. Conversely, resource imbalance occurs.

As shown in FIG. 3, the resource processing method of a cloud platform provided in this embodiment of the present disclosure can reduce resource fragment generation on the cloud platform. The method may include the following steps:

Step S310: Obtain a current first resource allocation ratio and a current second resource allocation ratio of each of the plurality of nodes.

In this embodiment of the present disclosure, the current first resource allocation ratio is a ratio of a sum of partial first resources allocated by the node to stock hosts deployed in the node to the first resource of the entire node. The current second resource allocation ratio is a ratio of a sum of partial second resources allocated by the node to the stock hosts deployed in the node to the second resource of the entire node.

For example, assuming that the first resource is a CPU and the second resource is a memory, a current CPU allocation ratio and a current memory allocation ratio of each node may be obtained. For each node, at least one stock host (a container is used as an example herein) has been deployed in the node, and a CPU resource of a fixed size (also referred to as a CPU quota of the container, that is, a CPU time slice) and a memory resource of a fixed size (also referred to as a memory quota of the container) have been allocated to each stock container. For a specific node, the current CPU allocation ratio Utilcpu may be calculated by using the following formula (1):

Utilcpu=Sum of CPU quotas of all stock containers that have been deployed in the node/CPU resource of the entire node (1)

Similarly, for the node, the current memory allocation ratio Utilmem may be calculated by using the following formula (2):

Utilmem=Sum of memory quotas of all stock containers deployed in the node/Memory resource of the entire node (2)

Step S320: Obtain a first resource limit and a second resource limit that are required by a newly added host.

For example, a CPU resource limit that needs to be allocated to the newly added host is represented as Limcpu, and a memory resource limit that needs to be allocated to the newly added host is represented as Limmem.

Step S330: Determine, among the plurality of modes, a target node according to the current first resource allocation ratio and the current second resource allocation ratio of each node, the first resource limit, and the second resource limit.

For example, a node in resource allocation imbalance may be found according to the current CPU allocation ratio Utilcpu and the current memory allocation ratio Utilmem of each node. Further, assuming that deploying the newly added host in a specific node in resource allocation imbalance according to according to the CPU resource limit Limcpu and the memory resource limit Limmem that are required by the newly added host enables the CPU allocation ratio and the memory allocation ratio of the node to become more balanced (that is, the two are more approximate to each other), the node may be used as the target node of the newly added host.

Step S340: Deploy the newly added host in the target node.

For example, a newly added container is deployed in the target node determined in the foregoing step, and the target node is used as a host machine of the newly added container.

In the method for processing a cloud platform resource fragment provided in this implementation of the present disclosure, the cloud platform may include a plurality of nodes, and each node may include a first resource and a second resource. A current first resource allocation ratio and a current second resource allocation ratio of each node are obtained, and a first resource limit and a second resource limit that are required by a newly added host are obtained, so that the target node may be determined according to the current first resource allocation ratio and the current second resource allocation ratio of each node, the first resource limit, and the second resource limit, to deploy the newly added host in the target node. On the one hand, through automatic resource fragment processing, the cloud platform can be prevented from generating resource fragments due to resource allocation imbalance of each node, thereby reducing resource fragments and improving the resource utilization rate. On the other hand, in addition to reducing the resource fragments of the cloud platform, resource allocation balance of each node can be improved, thereby saving resources.

Figure 4:
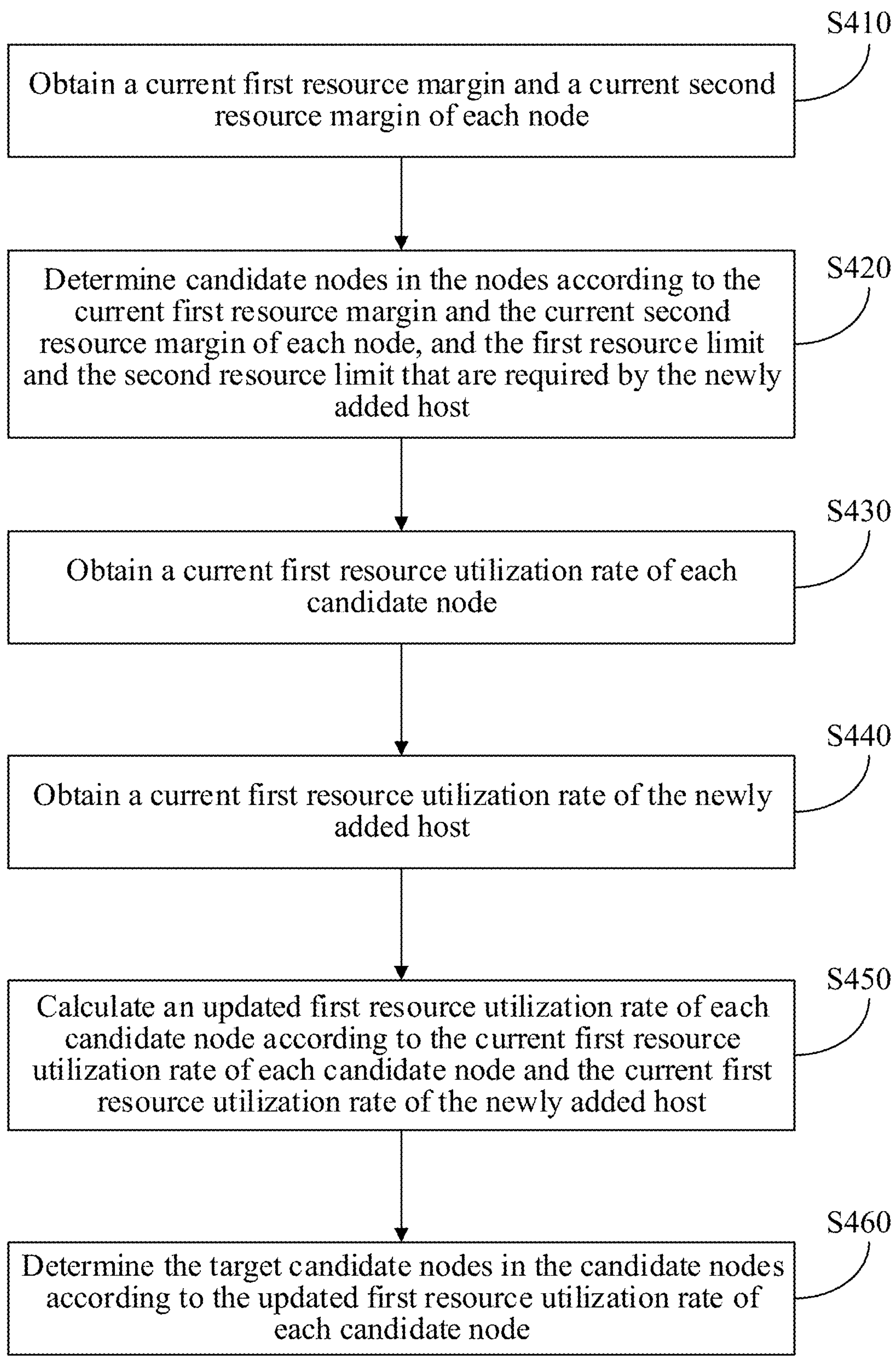
FIG. 4 is a schematic flowchart of a method for processing a cloud platform resource fragment according to an embodiment of the present disclosure.

FIG. 4 is a schematic flowchart of a resource processing method of a cloud platform according to an embodiment of the present disclosure.

As shown in FIG. 4, compared with the foregoing embodiment, the method provided in this embodiment of the present disclosure differs from the foregoing embodiment in that the method may further include the following steps after the first resource limit and the second resource limit that are required by the newly added host are obtained.

Step S410: Obtain a current first resource margin and a current second resource margin of each node.

In this embodiment of the present disclosure, the current first resource margin is the first resource of the entire node minus a sum of partial first resources that have been allocated by the node to stock hosts deployed in the node. The current second resource margin is the second resource of the entire node minus a sum of partial second resources that have been allocated by the node to the stock hosts deployed in the node.

For example, assuming that the first resource is a CPU and the second resource is a memory, a current CPU margin and a current memory margin of each node may be obtained. For each node, at least one stock host (a container is used as an example herein) has been deployed in the node, and a CPU resource of a fixed size (also referred to as a CPU quota of the container, that is, a CPU time slice) and a memory resource of a fixed size (also referred to as a memory quota of the container) have been allocated to each stock container. For a specific node, the current CPU margin REScpu may be calculated by using the following formula (3):

REScpu=CPU resource of the entire node−Sum of CPU quotas of all stock containers deployed in the node (3)

Similarly, for the node, the current memory margin RESmem may be calculated by using the following formula (4):

RESmem=Memory resource of the entire node−Sum of memory quotas of all stock containers deployed in the node (4)

Step S420: Determine candidate nodes in the nodes according to the current first resource margin and the current second resource margin of each node, and the first resource limit and the second resource limit that are required by the newly added host, to determine target candidate nodes in the determined candidate nodes.

In this embodiment of the present disclosure, a node is determined as a candidate node in the nodes in accordance with a determination that the current first resource margin of the node is greater than or equal to the first resource limit required by the newly added host, and the current second resource margin of the node is greater than or equal to the second resource limit required by the newly added host. Specifically, whether the current first resource margin of a node is greater than or equal to the first resource limit required by the newly added host and whether the current second resource margin of the node is greater than or equal to the second resource limit required by the newly added host may be determined. If the current first resource margin of a specific node is greater than or equal to the first resource limit required by the newly added host, and the current second resource margin of the node is greater than or equal to the second resource limit required by the newly added host, the node may be determined as a candidate node. Conversely, if the current first resource margin of a specific node is less than the first resource limit required by the newly added host or the current second resource margin of the node is less than the second resource limit required by the newly added host, it may be determined that the node is not a candidate node.

For example, if both the CPU margin and the memory margin of a specific node can satisfy the CPU limit and the memory limit that are required by a newly added host, it may be considered that the node is a candidate host machine with sufficient idle resources for the newly added host, and the node may be used as a candidate node of the newly added host.

Still referring to FIG. 4, after the candidate nodes in the nodes are determined, the method may further include the following steps:

Step S430: Obtain a current first resource utilization rate of each candidate node.

For example, a current CPU utilization rate (also referred to as a current load) of each candidate node is obtained. Although the first resource utilization rate is described by using a CPU utilization rate as an example in the following exemplary descriptions, the present disclosure is not limited thereto. For example, the first resource utilization rate may alternatively be a memory utilization rate.

Step S440: Obtain a current first resource utilization rate of the newly added host.

For example, a current average CPU/memory utilization rate of a server where the newly added host, such as a newly added container, is located may be obtained from the cloud platform as an average load of the newly added container, and the average load is used as the current first resource utilization rate of the newly added container. If the server where the newly added container is located is a new server, the first resource limit required by the newly added container may be used as the current first resource utilization rate. If a server includes a plurality of containers, the average load of the server is the overall load of the server divided by the quantity of the containers included in the server.

Step S450: Calculate an updated first resource utilization rate of each candidate node according to the current first resource utilization rate of each candidate node and the current first resource utilization rate of the newly added host.

For example, it may be estimated that after the newly added host is deployed in a candidate node, the updated CPU utilization rate of the candidate node=the current CPU utilization rate of the candidate node+the current CPU utilization rate of the newly added host.

Step S460: Determine the target candidate nodes among the candidate nodes according to the updated first resource utilization rate of each candidate node, to identify one of the determined target candidate nodes as the target node.

For example, if the updated CPU utilization rate of a candidate node exceeds a specified high load threshold (for example, the high load threshold may be set to 70%, but the present disclosure is not limited thereto, and adjustment may be performed according to an actual requirement), it indicates that a high load will be caused in the candidate node if the newly added host is deployed to the candidate node. To avoid this case, the candidate node is excluded. Conversely, if the updated CPU utilization rate of a candidate node does not exceed the high load threshold, the candidate node may be used as a target candidate node.

The resource processing method of a cloud platform provided in this implementation of the present disclosure not only can ensure resource allocation balance of the target node after the newly added host is deployed, but also takes an operation load status of the target node, for example, the CPU utilization rate, into account to avoid a high load of the target node after the newly added container is deployed.

Figure 5:
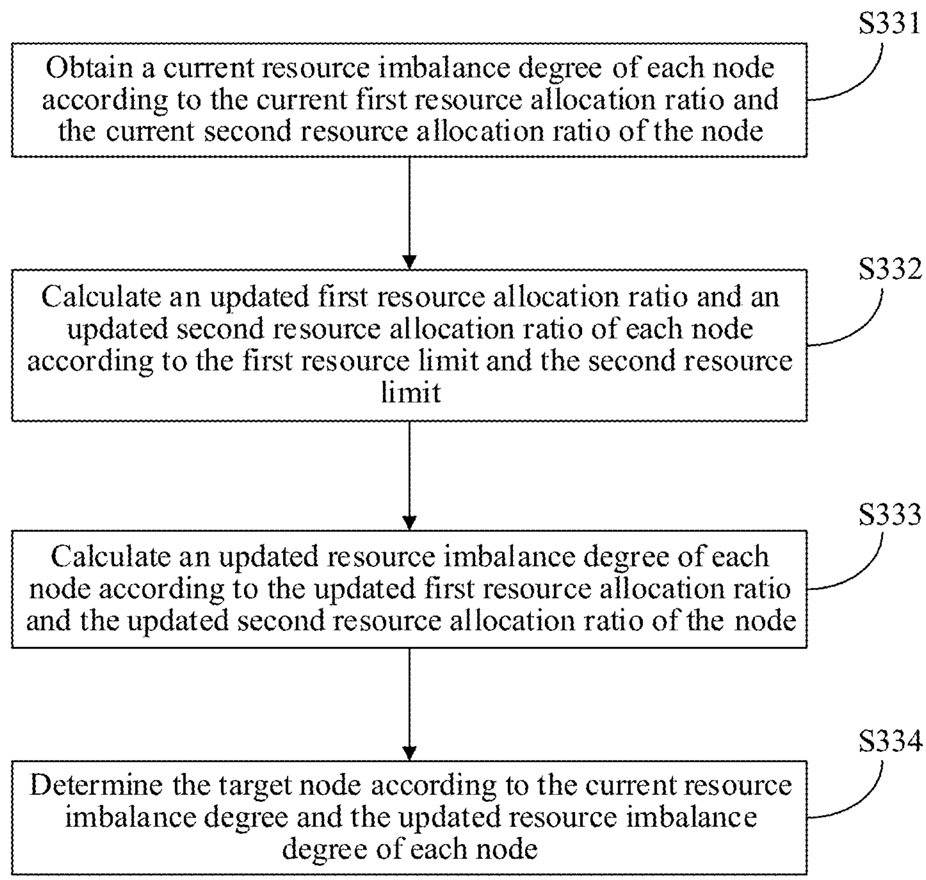
FIG. 5 is a schematic diagram of a processing procedure of step S330 shown in FIG. 3 in an embodiment.

FIG. 5 is a schematic diagram of a processing procedure of step S330 shown in FIG. 3 in an embodiment.

As shown in FIG. 5, in this embodiment of the present disclosure, step S330 may further include the following steps.

Step S331: Obtain a current resource imbalance degree of each target candidate node according to the current first resource allocation ratio and the current second resource allocation ratio of the target candidate node.

In this embodiment of the present disclosure, the current resource imbalance degree is used for measuring a degree of difference between allocation ratios of resources on a node. A larger difference between allocation ratios of different resources indicates a higher current resource imbalance degree. Conversely, a smaller difference between allocation ratios of different resources indicates a lower current resource imbalance degree.

For example, assuming that the current first resource allocation ratio of a target candidate node is a CPU allocation ratio represented as Utilcpu and the current second resource allocation ratio is a memory allocation ratio represented as Utilmem, the current resource imbalance degree of the target candidate node may be calculated by using the following formula (5):

$$\text{Current resource imbalance degree} = \frac{100 * \text{Max}(Util_{cpu}, Util_{mem})}{|Util_{cpu} - Util_{mem}|} \quad (5)$$

Step S332: Calculate an updated first resource allocation ratio and an updated second resource allocation ratio of each target candidate node according to the first resource limit and the second resource limit.

In this embodiment of the present disclosure, assuming that the current newly added host is deployed in the target candidate node, the first resource limit and the second resource limit are allocated to the newly added host. The updated first resource allocation ratio is calculated according to a sum of first resource quotas of stock hosts that have been deployed in the target candidate node, the first resource of the entire target candidate node, and the first resource limit. The updated second resource allocation ratio is calculated according to a sum of second resource quotas of the stock hosts that have been deployed in the target candidate node, the second resource of the entire target candidate node, and the second resource limit.

For example, assuming that the first resource limit required by the newly added host is a CPU limit represented as Limcpu, the corresponding updated first resource allocation ratio is an updated CPU allocation ratio, the updated second resource allocation ratio is an updated memory allocation ratio, and the second resource limit is a memory limit represented as Limmem. Assuming that the newly added host is deployed in the target candidate node, the updated CPU allocation ratio Util'cpu of the target candidate node may be calculated by using the following formula (6):

Util'cpu=(Sum of CPU quotas of all stock containers that have been deployed in the target candidate node+Limcpu)/CPU resource of the entire target candidate node (6)

Similarly, for the target candidate node, the updated memory allocation ratio Util'mem may be calculated by using the following formula (7):

Util'mem=(Sum of memory quotas of all stock containers that have been deployed in the target candidate node+Limmem)/Memory resource of the entire target candidate node (7)

Step S333: Calculate an updated resource imbalance degree of each target candidate node according to the updated first resource allocation ratio and the updated second resource allocation ratio of the target candidate node.

For example, the updated resource imbalance degree of the target candidate node may be calculated by using the following formula (8):'

$$\text{Updated resource imbalance degree} = \frac{100 * \text{Max}(Util'_{cpu}, Util'_{mem})}{|Util'_{cpu} - Util'_{mem}|} \quad (8)$$

A manner of calculating the current resource imbalance degree and the updated resource imbalance degree of each target candidate node is not limited to the formulas exemplified above provided that the manner satisfies the following condition: A larger difference between allocation ratios of different resources of the target candidate node indicates a higher resource imbalance degree.

Step S334: Determine the target node is determined according to the current resource imbalance degree and the updated resource imbalance degree of each target candidate node.

Figure 6:
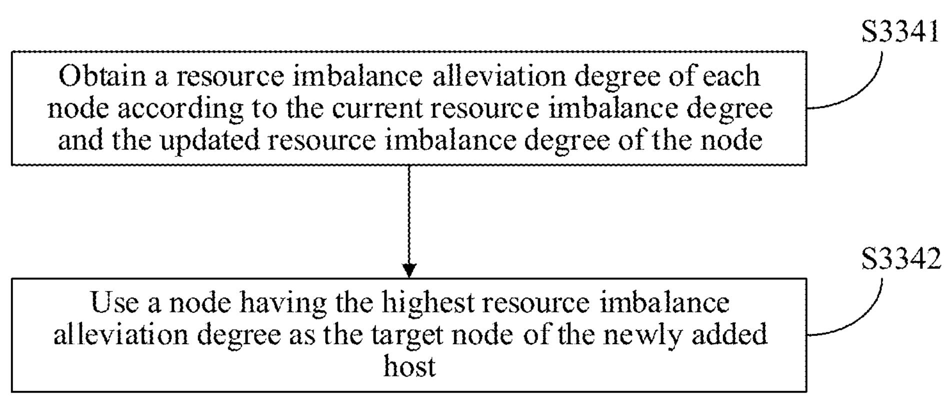
FIG. 6 is a schematic diagram of a processing procedure of step S334 shown in FIG. 4 in an embodiment.

FIG. 6 is a schematic diagram of a processing procedure of step S334 shown in FIG. 4 in an embodiment.

As shown in FIG. 6, in this embodiment of the present disclosure, step S334 may further include the following steps.

Step S3341: Obtain a resource imbalance alleviation degree of each target candidate node according to the current resource imbalance degree and the updated resource imbalance degree of the target candidate node.

In some embodiments, the resource imbalance alleviation degree is used for indicating a degree to which imbalance between allocation ratios of resources of each target candidate node is alleviated. For example, the resource imbalance alleviation degree of each target candidate node may be calculated by using the following formula (9):

Resource imbalance alleviation degree=|Current resource imbalance degree−Updated resource imbalance degree| (9)

Step S3342: Use a target candidate node having the highest resource imbalance alleviation degree as the target node of the newly added host.

In this embodiment of the present disclosure, the cloud platform includes a plurality of nodes (a plurality of host machines). When a newly added host, for example, a newly added container, selects a target node, that is, a target host machine, there may be a plurality of target candidate nodes whose current resource imbalance degrees may be alleviated. In this case, it may be assumed that after the newly added container is deployed to each target candidate node, an updated resource allocation ratio (for example, an updated first resource allocation ratio, an updated second resource allocation ratio, an updated third resource allocation ratio may be included) of the target candidate node may be calculated, and a resource imbalance alleviation degree of each target candidate node may be calculated according to a current resource allocation ratio (for example, a current first resource allocation ratio, a current second resource allocation ratio, and a current third resource allocation ratio may be included) of the target candidate node, and then a target candidate node having the highest resource imbalance alleviation degree is selected as the host machine in which the newly added host is deployed. If there are a plurality of target candidate nodes whose resource imbalance alleviation degrees are the highest and the same, one target candidate node may be randomly selected from the plurality of target candidate nodes as the target node of the newly added host.

FIG. 7 is a schematic diagram of a precautionary resource allocation policy according to an embodiment of the present disclosure.

As shown in FIG. 7, it is assumed that a coordinate system is established, an origin is O, a CPU allocation ratio is used as a horizontal coordinate, a memory allocation ratio is used as a vertical coordinate, and an oblique line in the middle indicates that a CPU allocation ratio and a memory allocation ratio of a node are equal, that is, resource allocation is in a balanced state, the oblique line being referred to as a balance line. A point of a node in the coordinate system is determined as A according to a current CPU allocation ratio and a current memory allocation ratio in the node. After a newly added container is deployed in the node, if coordinates (for example, a point A' in the figure) of a new CPU allocation ratio and a new memory allocation ratio of the node become closer to the balance line, it indicates that if the newly added host is allocated to the node, resource allocation of the node will become more balanced. Conversely, if coordinates (for example, a point A" in the figure) of the new CPU allocation ratio and the new memory allocation ratio of the node become farther from the balance line after the newly added host is deployed in the node, it indicates that if the newly added host is allocated to the node, resource allocation of the node will become more unbalanced. In this embodiment of the present disclosure, a host machine that can alleviate resource allocation imbalance is preferentially selected for deployment of a newly added host such as a newly added container.

In this embodiment of the present disclosure, two dimensions, namely, the memory and the CPU, are considered, a distance between a point and the balance line y=x (the horizontal coordinate x represents the CPU allocation ratio, and the vertical coordinate y represents the memory allocation ratio) is calculated in two-dimensional space. The distance is used for measuring a degree to which the newly added container influences resource allocation balance of the node. For example, a distance between a node and the balance line may be calculated by using the following formula (10):

$$D(Util_{cpu}, Util_{mem}) = \frac{|Util_{mem} - Util_{cpu}|}{\sqrt{2}} \tag{10}$$

In the foregoing formula, $D(\mathrm{Util}_{cpu}, \mathrm{Util}_{mem})$ represents a distance between a point of coordinates $(\mathrm{Util}_{cpu}, \mathrm{Util}_{mem})$ and the balance line.

In the foregoing embodiment, in accordance with a determination that the cloud platform includes a plurality of host machines, when selecting a target host machine, a newly added container selects a host machine having the highest resource imbalance alleviation degree as the target host machine if resource allocation imbalance of a plurality of host machines can be alleviated. However, the present disclosure is not limited thereto. In another embodiment, n (n is a positive integer greater than 1) host machines in the cloud platform may be numbered in sequence, it is assumed that the host machines are numbered from 1 to n, and a current CPU allocation ratio and a current memory allocation ratio of each host machine are obtained. Then, assuming that a newly added container is added to each current host machine, a new CPU allocation ratio and a new memory allocation ratio of the current host machine are calculated according to a CPU limit and a memory limit that are required by the newly added container. If it is determined through calculation for the first time that the newly added container can alleviate resource imbalance of a host machine, the newly added container is deployed to the host machine. For example, it can be learned through calculation that assuming that resource allocation imbalance is worsened when the newly added container is deployed in the first two host machines and resource allocation imbalance is alleviated when the newly added container is deployed in the third host machine, the newly added container is deployed in the third host machine. That is, it is not needed to search for a node having the highest resource imbalance alleviation degree as the target host machine provided that the newly added host is allocated to a node whose resource imbalance can be alleviated, so that a calculation amount can be reduced.

A scenario of preventing cloud platform resource fragments by using the method in the foregoing embodiment is provided below:

It is assumed that a total CPU capacity of a host machine B is 40 cores and a total memory capacity of the host machine B is 120 GB, and a sum of CPU quotas and a sum of memory quotas that have been allocated to stock containers on the host machine B are 35 cores and 60 GB respectively (that is, a current CPU allocation ratio is 87.5% and a current memory allocation ratio is 50%). Because a quantity of the remaining CPU cores is too small, it is difficult to allocate the remaining 60 GB of the memory on the host machine B, resulting in generation of memory resource fragments. In this case, if a newly added container needs to be deployed, and a CPU resource limit and a memory resource limit that are required by the newly added container are 1 core and 50 GB respectively, according to the prevention manner provided in this embodiment of the present disclosure, the newly added container may be preferentially deployed in the host machine B. After the deployment, the updated CPU allocation ratio of the host machine B is 90%, and the updated memory allocation ratio of the host machine B is 91%, thereby directly resolving the problem of resource fragments on the host machine B. For CPU resource fragments, a processing scenario is similar.

Most of the solutions to cloud platform resource fragments in the related art are merely undiversified prevention or post-adjustment policies. In the undiversified prevention policy, only a newly deployed container or virtual machine can be controlled. However, during actual operation of the cloud platform, as a plurality of operations apply for and release resources in the cloud platform, a host machine may generate resource fragments due to migration or offline of containers or virtual machines. Consequently, performance of resource allocation is degraded, or resource allocation cannot be performed, resulting in that operations cannot be normally performed, and a resource utilization rate of the cloud platform is reduced. In the undiversified prevention policy, fragment adjustment cannot be performed on stock hosts in the host machine on the cloud platform.

In addition, in the post-adjustment method in the related art, through statistical analysis, a container or a virtual machine on a node in resource allocation imbalance is directly expelled, and an allocator of the cloud platform selects another node to redeploy the expelled container or virtual machine. The redeployment relies on preference-for-idleness or preference-for-saturation algorithms without giving priority to mutual adjustment between nodes in resource allocation imbalance, resulting in low adjustment efficiency.

FIG. 8 is a schematic flowchart of a method for processing a cloud platform resource fragment according to another embodiment of the present disclosure.

As shown in FIG. 8, compared with the foregoing embodiment, the method for processing a cloud platform resource fragment provided in this embodiment of the present disclosure differs from the foregoing embodiment in that the method may further include the following steps.

Step S810: Determine whether each node is currently in a resource balanced state, a first resource unbalanced state, or a second resource unbalanced state according to the current first resource allocation ratio and the current second resource allocation ratio of the node.

Figure 9:
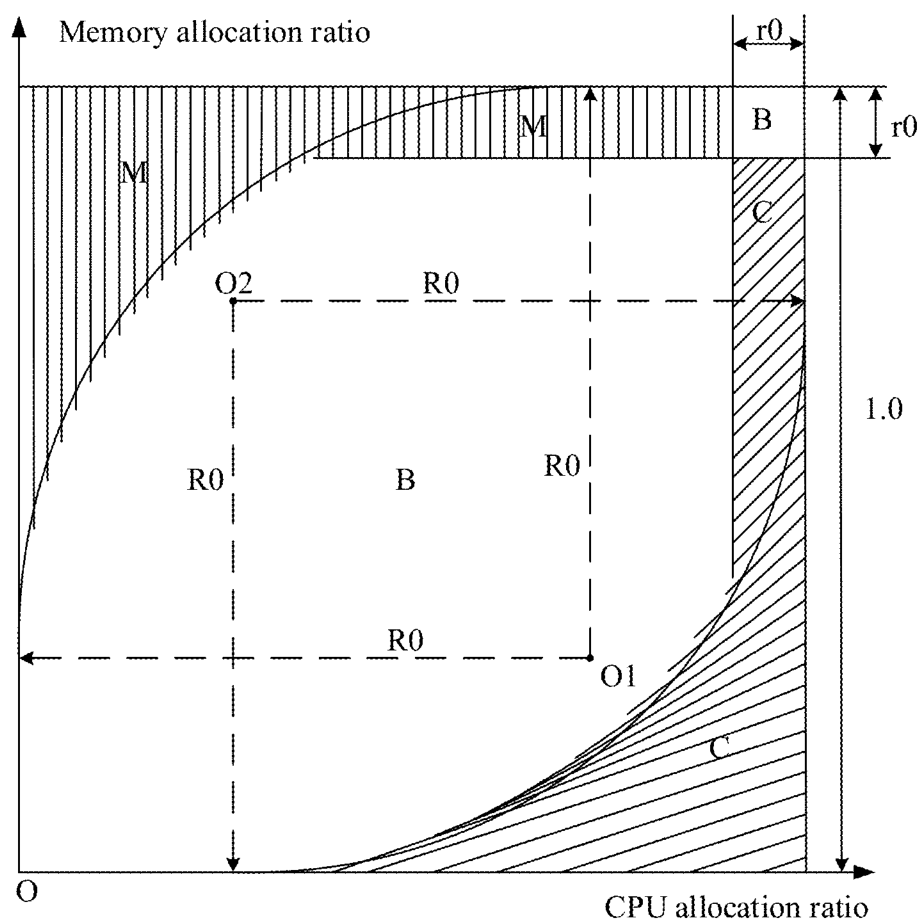
FIG. 9 is a schematic diagram of resource allocation classification according to an embodiment of the present disclosure.

In an exemplary embodiment, the determining whether each node is currently in a resource balanced state (the node is in the region B in FIG. 9), a first resource unbalanced state (the node is in the region C in FIG. 9), or a second resource unbalanced state (the node is in the region M in FIG. 9) according to the current first resource allocation ratio (for example, the CPU allocation ratio) and the current second resource allocation ratio (for example, the memory allocation ratio) of the node may include: normalizing the current first resource allocation ratio and the current second resource allocation ratio of the node; and determining that the node is currently in the first resource unbalanced state (for example, a CPU unbalanced state) in accordance with a determination that a distance between the current first resource allocation ratio (for example, Utilcpu) and the current second resource allocation ratio (for example, Utilmem) of the node after the normalization and a first circle center (for example, O1 in FIG. 9) or a second circle center (for example, O2 in FIG. 9) is greater than or equal to a first radius (for example, R0 in FIG. 9), and the current first resource allocation ratio is greater than the current second resource allocation ratio after the normalization, or in accordance with a determination that the current first resource allocation ratio of the node is greater than a second radius (for example, (1−r0) in FIG. 9) after the normalization, and the current second resource allocation ratio is less than the second radius.

In an exemplary embodiment, the determining whether each node is currently in a resource balanced state, a first resource unbalanced state, or a second resource unbalanced state according to the current first resource allocation ratio and the current second resource allocation ratio of the node may further include: determining that the node is currently in the second resource unbalanced state (for example, a memory unbalanced state) in accordance with a determination that the distance between the current first resource allocation ratio and the current second resource allocation ratio of the node after the normalization and the first circle center or the second circle center is greater than or equal to the first radius, and the current first resource allocation ratio after the normalization is less than the current second resource allocation ratio, or in accordance with a determination that the current first resource allocation ratio of the node after the normalization is less than the second radius, and the current second resource allocation ratio is greater than the second radius.

Step S820: Migrate a stock host from a node in the first resource unbalanced state that causes first resource allocation imbalance to a node in the second resource unbalanced state or the resource balanced state.

For example, a stock container or virtual machine that is in a node in the CPU unbalanced state and that causes CPU allocation imbalance of the node may be migrated to a node in the memory unbalanced state or a relatively balanced state of CPU and memory allocation. Similarly, a stock host that is in a node in the memory unbalanced state and that causes memory allocation imbalance of the node may alternatively be migrated to a node in the CPU unbalanced state or a relatively balanced state of CPU and memory allocation. Directional migration of a stock host can improve resource allocation balance of both a node in CPU resource allocation imbalance and a node in memory resource allocation imbalance.

FIG. 9 is a schematic diagram of resource allocation classification according to an embodiment of the present disclosure.

With reference to FIG. 9, a current state of each node is classified and determined. As shown in FIG. 9, a CPU allocation ratio is used as a horizontal coordinate, and a memory allocation ratio is used as a vertical coordinate. The CPU allocation ratio and the memory allocation ratio of each node are both normalized, that is, the side length of the outermost square is 1, for ease of calculation.

r0 in the figure is a constant value configured based on experience, and is used for determining whether a CPU resource or a memory resource is to be allocated completely. For example, if r0=0.05, when an allocation ratio of a resource is higher than (1−r0), for example, 0.95, it indicates that the allocation ratio of the resource is relatively high. R0 is also a constant value set based on experience, for example, R0=0.75, and is used for defining a range of resource balance points. The arc at the junction between the vertical line-shaded region and the blank region in the figure represents a part of a circular arc with O1 as the circle center and R0 as the radius. The arc at the junction between the oblique line-shaded region and the blank region in the figure represents a part of a circular arc with O2 as the circle center and R0 as the radius. O1 and O2 are circle center points, and fall on a diagonal line of the dashed line square. Specific positions of O1 and O2 are determined by R0. In the square whose side length is 1 in the figure, the vertical line-shaded region is marked as M, the blank region is marked as B, the oblique line-shaded region is marked as C, and the area of the square whose side length is 1 is equal to M+B+C.

In this embodiment of the present disclosure, before a host machine in resource allocation imbalance is adjusted, an imbalance status of the host machine needs to be determined and classified. As shown in FIG. 9, the CPU allocation ratio and the memory allocation ratio are used as coordinates. Statuses of resource balance of the host machine may be classified into three types, and a classification formula (11) is as follows:

$$S(P) = \begin{cases} M, \text{ if } (d(P, Od) \geq R0 \text{ and } Util_{mem} > Util_{cpu}) \\ \text{or } (Util_{mem} > (1 - r0) \text{ and } Util_{cpu} < (1 - r0)) \\ C, \text{ if } (d(P, Od) \geq R0 \text{ and } Util_{mem} < Util_{cpu}) \\ \text{or } (Util_{mem} < (1 - r0) \text{ and } Util_{cpu} > (1 - r0)) \\ B, \text{ another case} \end{cases} \quad (11)$$

In the formula (11), it is assumed that coordinates of a node P are (Utilcpu, Utilmem), Od is a circle center point, for example, O1 and O2 in the figure (because only two resource dimensions, namely, the CPU and the memory, are used herein as an example for exemplary description, only two circle center points are shown, and in a case of more resource dimensions, circle center points are correspondingly increased), d(P, Od) represents a distance between the node P and each circle center point, and S(P) represents a balance classification result of the node P. If the result is M, it indicates that the node P is currently in a memory unbalanced state, that is, the coordinates of the node P fall within the region M in the figure, and there are a large quantity of idle CPU fragments; if the result is C, it indicates that the node P is currently in a CPU unbalanced state, that is, the coordinates of the node P fall within the region C in the figure, and there are a large quantity of idle memory fragments; and if the result is B, that is, the coordinates of the node P fall within the region B, it indicates relatively proper resource allocation and a resource balanced state of the node P, so that stock hosts of the node P do not need to be adjusted.

Figure 10:
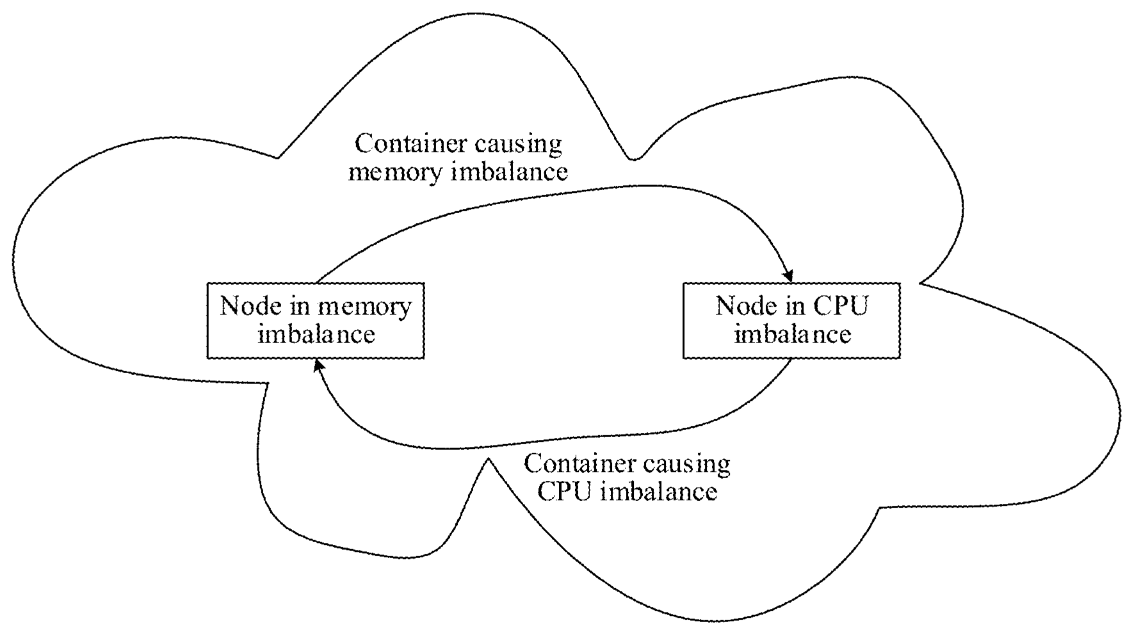
FIG. 10 is a schematic diagram of resource allocation balance scheduling according to an embodiment of the present disclosure.

FIG. 10 is a schematic diagram of resource allocation balance scheduling according to an embodiment of the present disclosure.

In this embodiment of the present disclosure, according to the resource allocation balance scheduling shown in FIG. 10, a stock container (or a stock virtual machine) that is in a node in memory imbalance and that causes memory imbalance may be directionally migrated to a node in CPU imbalance (or may be migrated to a node in a resource balanced state). Also, a stock container (or a stock virtual machine) that is in a node in CPU imbalance and that causes CPU imbalance may be directionally migrated to a node in memory imbalance. The final objective is to balance resource allocation ratios of each node on the cloud platform, so that when a resource is completely allocated, another resource will not be wasted due to that the resource cannot be allocated.

The resource processing method of a cloud platform provided in this embodiment of the present disclosure includes two sections, namely, prevention and post-adjustment. Prevention is used for processing an added container or virtual machine (that is, a newly added host), and post-adjustment is used for processing a stock container or virtual machine.

Figure 11:
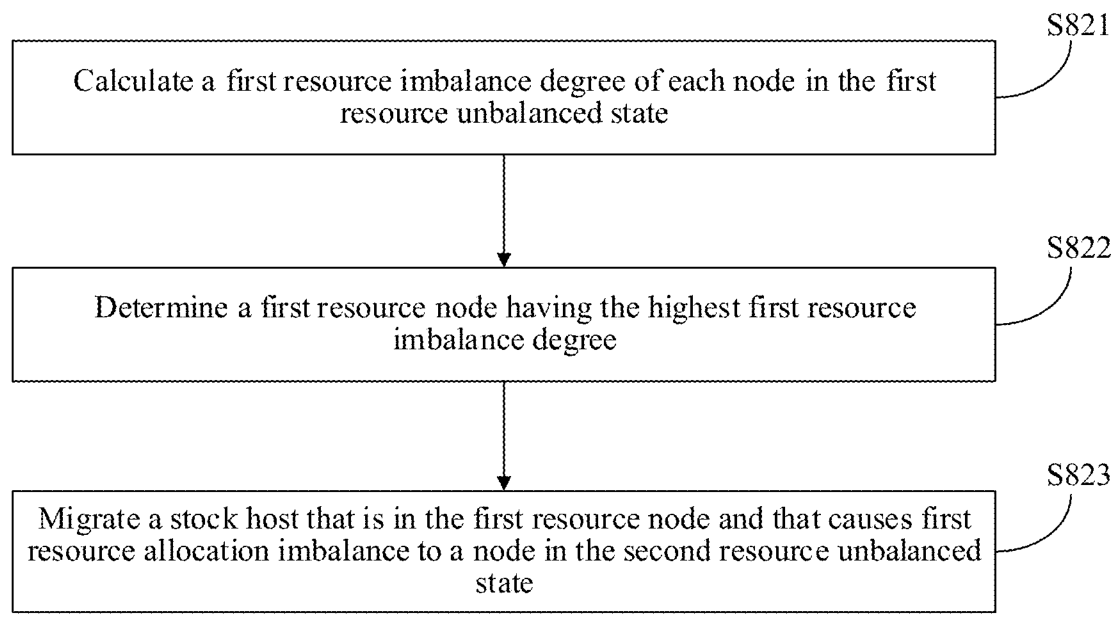
FIG. 11 is a schematic diagram of a processing procedure of step S820 shown in FIG. 8 in an embodiment.

FIG. 11 is a schematic diagram of a processing procedure of step S820 shown in FIG. 8 in an embodiment.

As shown in FIG. 11, in this embodiment of the present disclosure, step S820 may further include the following steps.

Step S821: Calculate a first resource imbalance degree of each node in the first resource unbalanced state.

For example, to distinguish processing priorities of nodes of the same type (nodes that are all in a CPU unbalanced state are used as an example herein) according to an imbalance degree, a first resource imbalance degree of each node in the CPU unbalanced state may be calculated. For a calculation formula, the formula (1) in the foregoing embodiment may be referred to. However, the present disclosure is not limited thereto, provided that the following condition can be satisfied: A larger allocation ratio difference between different resources of a node indicates a higher resource imbalance degree and a higher processing priority.

Similarly, a second resource imbalance degree of each node in a memory unbalanced state may also be calculated.

Step S822: Determine a first resource node having the highest first resource imbalance degree.

For example, the first resource imbalance degree of each node in the CPU unbalanced state may be calculated according to the formula (1), then the nodes are sorted in descending order or ascending order of the magnitude of the first resource imbalance degree, and a node having the highest first resource imbalance degree is found and used as the first resource node.

Similarly, the second resource imbalance degree of each node in the memory unbalanced state may be calculated, then the nodes are sorted in descending order or ascending order of the magnitude of the second resource imbalance degree, and a node having the highest second resource imbalance degree is found and used as a second resource node. Then, the first resource node and the second resource node may be preferentially processed.

Step S823: Migrate a stock host from the first resource node that causes first resource allocation imbalance to a node in the second resource unbalanced state.

For example, a container that is in a node in the most serious memory imbalance and that causes memory imbalance may be preferentially migrated to a node in the most serious CPU imbalance. Similarly, a container that is in the node in the most serious CPU imbalance and that causes CPU imbalance may also be migrated to the node in the most serious memory imbalance.

Figure 12:
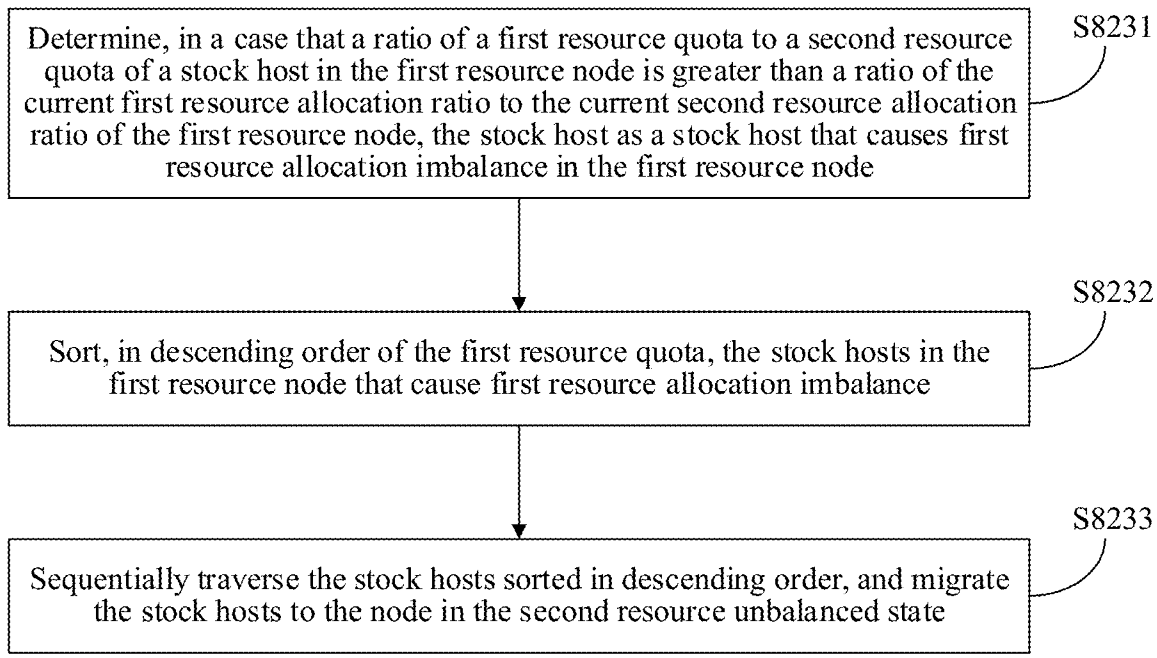
FIG. 12 is a schematic diagram of a processing procedure of step S823 shown in FIG. 11 in an embodiment.

FIG. 12 is a schematic diagram of a processing procedure of step S823 shown in FIG. 11 in an embodiment.

As shown in FIG. 12, in this embodiment of the present disclosure, step S823 may further include the following steps.

Step S8231: Determine, if a ratio of a first resource quota (for example, a CPU quota) to a second resource quota (for example, a memory quota) of a stock host in the first resource node is greater than a ratio of the current first resource allocation ratio (for example, the current CPU allocation ratio) to the current second resource allocation ratio (for example, the current memory allocation ratio) of the first resource node, the stock host as a stock host that causes first resource allocation imbalance of the first resource node.

For example, a CPU quota of a container is a CPU resource (that is, a CPU time slice) of a fixed size that is allocated to the container after the container is deployed in a host machine, and a memory quota of a container is a memory resource of a fixed size that is allocated to the container.

Step S8232: Sort, in descending order of the first resource quota, the stock hosts in the first resource node that cause first resource allocation imbalance.

Step S8233: Sequentially traverse the stock hosts sorted in descending order, and migrate the stock hosts to the node in the second resource unbalanced state.

In this embodiment of the present disclosure, if there are both a plurality of host machines in memory imbalance and a plurality of host machines in CPU imbalance in the cloud platform, how to migrate a container in an unbalanced node to a host machine may be determined in the following migration manner:

Step one: Sort the nodes in the CPU unbalanced state in descending order of the first resource imbalance degree, and process the nodes in CPU imbalance one by one.

Step two: First sort stock containers (a container is used as an example herein, but the present disclosure is not limited thereto) that have been deployed in a node K when the node K is processed.

For example, the stock containers may be sorted in descending order of a degree to which each stock container influences CPU imbalance of the node K, that is, the stock containers are sorted in descending order of a CPU quota allocated to each stock container of the node K. Moreover, when a ratio of a CPU quota of a container to a memory quota of the container is greater than a ratio of a CPU allocation ratio of the node K to a memory allocation ratio of the node K, it indicates that the container is a container that causes memory imbalance to the node K.

Step three: Sequentially traverse the sorted stock containers of the node K, and try to migrate the stock containers to a node in the memory unbalanced state.

For example, the nodes in the memory unbalanced state may be sorted in descending order of the second resource imbalance degree, and the first stock container of the node K that is obtained after the sorting is preferentially migrated to a second resource node. If the migration to the second resource node fails, the second stock container of the node K that is obtained after the sorting may be migrated to the second node in the memory unbalanced state that is obtained after the sorting, and so on until the migration succeeds.

Step four: Continue to migrate a next stock container of the node K that is obtained after the sorting if the first stock container is successfully migrated, and similarly, start to try to migrate the next stock container to the second resource node in the memory unbalanced state that is obtained after the sorting until the next stock container is successfully migrated.

Step five: Repeat step four until the node K is in the resource balanced state, and end migration of the stock containers in the node K.

A similar migration manner may be used for directional migration of a stock host that is in a node in the memory unbalanced state and that causes memory imbalance.

In the method for processing a cloud platform resource fragment provided in this embodiment of the present disclosure, both a prevention policy and a post-adjustment policy are used. The prevention policy is used for controlling a newly deployed container or virtual machine, and the post-adjustment policy is used for adjusting a stock container or virtual machine in an unbalanced node. The post-adjustment policy may include three main steps: imbalance classification (for example, three types, namely, M, B, and C), imbalance grading (for example, the foregoing imbalance degree calculation), and imbalance scheduling, so that overall allocation of various resources of the cloud platform tends to be balanced.

A scenario in which a stock host is processed by using the post-adjustment policy provided in this embodiment of the present disclosure is described below.

It is assumed that total CPU capacities of a host machine D and a host machine E are both 40 cores, total memory capacities of the host machine D and the host machine E are both 120 GB, 10 cores of the CPU and 100 GB of the memory have been allocated to the host machine D (a CPU allocation ratio and a memory allocation ratio are 25% and 83% respectively), where a container d on the host machine D occupies two cores of the CPU and 60 GB of the memory, and 30 cores of the CPU and 10 GB of the memory have been allocated on the host machine E (a CPU allocation ratio and a memory allocation ratio are 75% and 8.3% respectively). According to the post-processing policy provided in this embodiment of the present disclosure, the container d on the host machine D may be directionally migrated to the host machine E. Resource allocation of the two host machines becomes more balanced after the adjustment. The CPU allocation ratio and the memory allocation ratio of the host machine D become 20% and 33.3% respectively, and the CPU allocation ratio and the memory allocation ratio of the host machine E become 80% and 58% respectively. In the following embodiment, similar processing may be performed on an operation load of a host machine, and the allocation ratio herein is changed to a utilization rate.

The prevention policy used in the related art only takes a resource allocation status of the host machine into account without taking an operation load status of the host machine into account. In this embodiment of the present disclosure, balance scheduling may include resource allocation balance scheduling and load balance scheduling. In this embodiment of the present disclosure, a load refers to a CPU utilization rate of a host machine.

Figure 13:
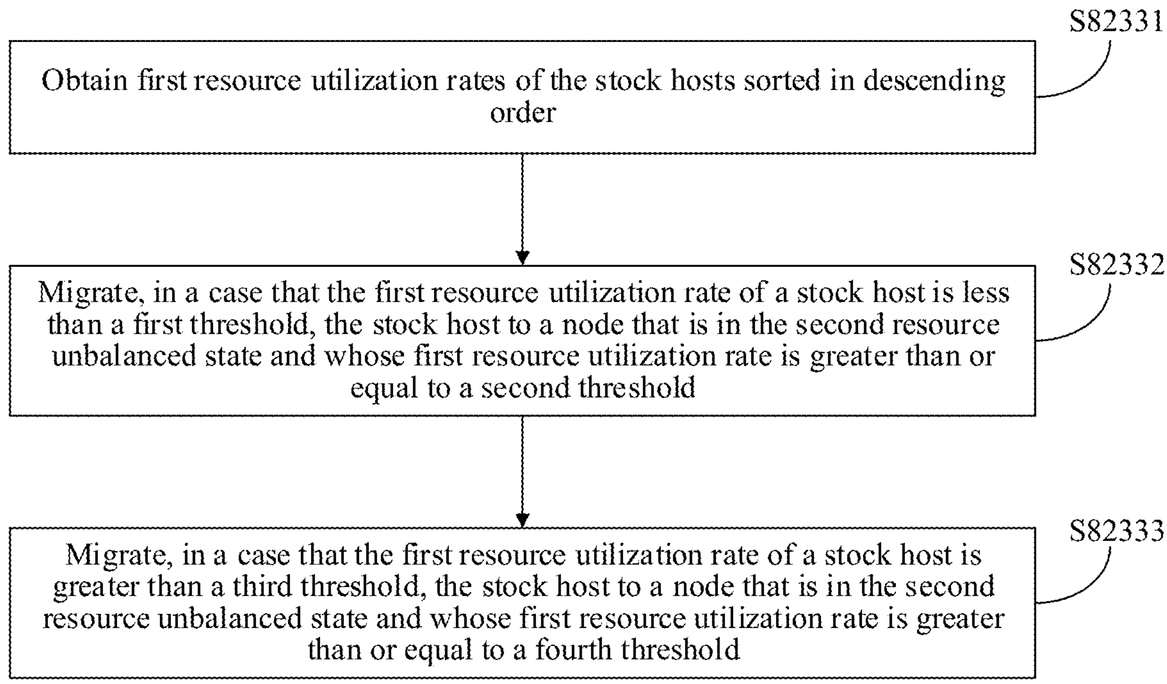
FIG. 13 is a schematic diagram of a processing procedure of step S8233 shown in FIG. 12 in an embodiment.

FIG. 13 is a schematic diagram of a processing procedure of step S8233 shown in FIG. 12 in an embodiment.

As shown in FIG. 13, in this embodiment of the present disclosure, step S8233 may further include the following steps.

Step S82331: Obtain first resource utilization rates of the stock hosts sorted in descending order.

In this embodiment of the present disclosure, still using the foregoing node K as an example, CPU utilization rates of the stock hosts sorted in descending order of the first resource quota are obtained.

A container is used as an example, and the CPU utilization rate of a container may be calculated by using the following formula (12):

$$\text{CPU utilization rate (load) of a container} = \text{CPU time slice actually used by the container} / \text{CPU quota of the container} \quad (12)$$

The CPU quota of the container is a CPU time slice actually allocated to the container.

Step S82332: Migrate, in accordance with a determination that the first resource utilization rate of a stock host is less than a first threshold, the stock host to a node that is in the second resource unbalanced state and whose first resource utilization rate is greater than or equal to a second threshold.

For example, the first threshold may be set to 20% (which is only used for exemplary description herein, and the present disclosure is not limited thereto). If a fixed CPU quota is allocated to a stock container, but the CPU quota is not actually used, and the CPU utilization rate is, for example, less than 20%, it indicates that the stock container has a low load or a low CPU utilization rate. In this case, the low-load stock container may be directionally migrated to a high-load or load-balanced node.

Specifically, the second threshold may also be set to 20% (which is only used for exemplary description herein, the second threshold may be equal to or not equal to the first threshold, and the present disclosure is not limited thereto). The CPU utilization rate of a node may be calculated by using the following formula (13):

$$\text{CPU utilization rate (load) of a node} = \text{Sum of CPU time slices actually used by all stock hosts on the node} / \text{CPU resource of the entire node} \quad (13)$$

If the CPU utilization rate of a node is higher than 20%, it may be determined that the node is a high-load or load-balanced node.

Still referring to FIG. 13, the method may further include step S82333: Migrate, in accordance with a determination that the first resource utilization rate of a stock host is greater than a third threshold, the stock host to a node that is in the second resource unbalanced state and whose first resource utilization rate is greater than or equal to a fourth threshold.

The first threshold may be less than the third threshold (for example, the third threshold may be 70%, which is only used as for exemplary description herein, and the present disclosure is not limited thereto). The second threshold may be less than the fourth threshold (for example, the fourth threshold may be 70%, which is only used for exemplary description herein, and the present disclosure is not limited thereto). The third threshold may be equal to or not equal to the fourth threshold.

For example, if the CPU utilization rate of a container on the node K is greater than 70%, it indicates that the container fully uses the CPU quota allocated to the container, and it may be determined that the container is a high-load or high-CPU utilization rate container. The high-load container may be migrated to a low-load or load-balanced node (for example, a node whose CPU utilization rate is less than or equal to 20%).

In the method for processing a cloud platform resource fragment provided in this implementation of the present disclosure, both a prevention policy and a post-adjustment policy are used for resolving the problem of resource fragments of the host machine, thereby effectively reducing the resource fragments. The prevention policy is to sort candidate host machines according to the imbalance alleviation degree when a target host machine is selected by using an allocator of the cloud platform to deploy the newly added host, and preferentially deploy the newly added host in a host machine in resource allocation imbalance. The post-adjustment policy is to migrate stock hosts among unbalanced host machines by analyzing the resource fragment statuses of all host machines on the cloud platform. The post-adjustment is targeted, the adjustment efficiency is high, and the fragment problem is quickly alleviated. In addition, in the post-adjustment policy, not only is the resource allocation status of the host machine taken into account, but also the operation load is comprehensively taken into account, thereby improving the operation load balance of the host machine.

Figure 14:
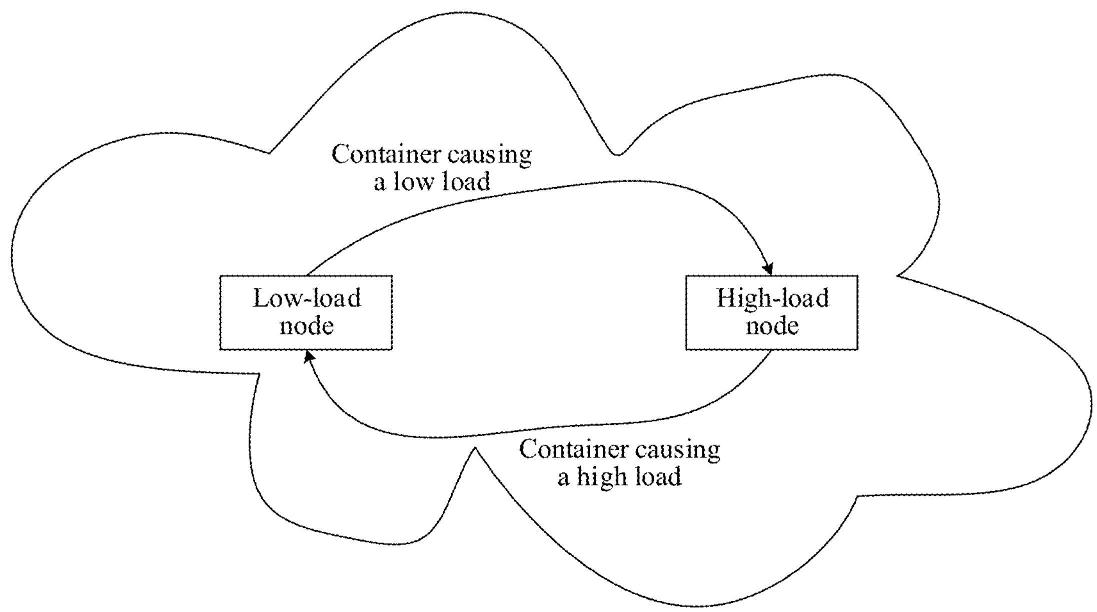
FIG. 14 is a schematic diagram of load balance scheduling according to an embodiment of the present disclosure.

FIG. 14 is a schematic diagram of load balance scheduling according to an embodiment of the present disclosure.

In this embodiment of the present disclosure, the load balance scheduling is shown in FIG. 14. The load factor is taken into account in resource allocation balance scheduling. However, even if the resource allocation is balanced, a node may still have a low load or a high load. Load balance is mainly related to the CPU utilization rate of the node. Therefore, in the main policy of load balance scheduling, a container that is in a low-load node and that causes a low CPU utilization rate may be migrated to a high-load/normal-load node. Alternatively, a container that is in a high-load node and that causes a high CPU utilization rate may also be migrated to a low-load/normal load node.

In this embodiment of the present disclosure, if there are both a plurality of low-load host machines and a plurality of high-load host machines in the cloud platform, how to migrate a container in a low-load node to a host machine may be determined in the following migration manner:

Step one: Calculate a CPU utilization rate of each node, and classify, according to the CPU utilization rate of the node, the node into any one of the following three types: a low-load node (for example, the CPU utilization rate of the node is less than 20%), a normal-load node (for example, the CPU utilization rate of the node is greater than or equal to 20% and less than or equal to 70%), and a high-load node (for example, the CPU utilization rate of the node is greater than 70%). The low-load nodes are sorted in ascending order of the CPU utilization rate, that is, a node having the lowest CPU utilization rate ranks the first. The high-load nodes are sorted in descending order of the CPU utilization rate, that is, a node having the highest CPU utilization rate ranks the first. The first low-load node obtained after the sorting is preferentially processed, or the first high-load node obtained after the sorting is preferentially processed, and then the nodes are sequentially traversed. That is, a node in the most serious load imbalance is preferentially processed.

Step two: First sort stock containers (a container is used as an example herein, but the present disclosure is not limited thereto) that have been deployed on a low-load node K when the low-load node K is processed.

For example, the stock containers may be sorted in ascending order of a degree to which each stock container influences load imbalance of the low-load node K. Specifically, the stock containers are sorted in ascending order of a CPU utilization rate of each stock container of the low-load node K. Moreover, when a CPU utilization rate of a container is smaller than a CPU utilization rate of the node K, it indicates that the container is a low-load container that causes load imbalance of the low-load node K.

If a high-load node Q is processed, stock containers (a container is used as an example herein, but the present disclosure is not limited thereto) that have been deployed on the high-load node Q are first sorted.

For example, the stock containers may be sorted in descending order of a degree to which each stock container influences load imbalance of the high-load node Q, that is, the stock containers are sorted in descending order of a CPU utilization rate of each stock container of the high-load node Q. Moreover, when a CPU utilization rate of a container is greater than a CPU utilization rate of the node Q, it indicates that the container is a high-load container that causes load imbalance to the high-load node Q.

Step three: Sequentially traverse the sorted stock containers of the low-load node K, and try to migrate the stock containers to high-load nodes.

For example, the first stock container of the low-load node K that is obtained after the sorting may be preferentially migrated to the first high-load node that is obtained after the sorting. If the first migration fails, the second stock container of the low-load node K that is obtained after the sorting may be migrated to the second high-load node that is obtained after the sorting, and so on until the migration succeeds.

Similarly, the sorted stock containers of the high-load node Q are sequentially traversed and migrated to a low-load node.

Step four: Continue to migrate a next stock container in the node K that is obtained after the sorting if the first stock container in the low-load node K that is obtained after the sorting is successfully migrated, and similarly, start to try to migrate the next stock container to the first high-load node that is obtained after the sorting until the next stock container is successfully migrated.

Step five: Repeat step four until the low-load node K is in a load balanced state, and end migration of the stock containers in the node K.

In this embodiment of the present disclosure, to reduce a quantity of migrations and avoid imbalance of another dimensional indicators caused by migration, the node migration needs to meet the following conditions:

(1) A most influential node is preferentially migrated.

Specifically, in the process of resource balance scheduling, a node having the highest resource allocation imbalance degree is preferentially processed, and a stock host in a node in resource allocation imbalance that influences the resource allocation imbalance the most is preferentially migrated. In the process of load balance scheduling, a node having the highest load imbalance degree is preferentially processed, and a stock host in a node in load imbalance that influences the load imbalance the most is preferentially migrated.

For example, a first host machine having the highest imbalance score (which may be a resource imbalance degree or a load imbalance degree) is first calculated. Then, degrees of influence on the imbalance score of containers in the first host machine that causes resource imbalance or load imbalance, and a container having the highest influence degree is preferentially migrated. Then, a container having a second highest influence degree in the first host machine is migrated, until all the containers in the first host machine that influence the imbalance score are migrated. Subsequently, similar processing is performed on containers in a second host machine having the second highest imbalance score, and so on until load balance and resource balance are achieved.

(2) When a node from which a container is migrated has a low load, a container having a low CPU utilization rate is preferentially migrated.

If there are a plurality of containers causing resource imbalance in the same host machine, degrees of influence of the plurality of containers on resource imbalance are the same, and the host machine has a low load, a container having the lowest CPU utilization rate in the host machine is preferentially migrated.

(3) When a node to which a container is migrated has a low load, a container having a low CPU utilization rate cannot be migrated to the node.

For example, when resource allocation balance scheduling is performed, a container causing memory imbalance may be migrated to a host machine in CPU imbalance. However, if the container causing memory imbalance has a low load and the host machine to which the container is migrated also has a low load, the container cannot be migrated to the low-load host machine.

(4) Resource allocation imbalance/a high load/a low load cannot be caused on a node to which a container is migrated or a node from which a container is migrated.

In the method for processing a cloud platform resource fragment provided in this implementation of the present disclosure, through automatic processing of resource fragments, the problem of cloud platform resource fragments can be prevented and handled. On the one hand, the problem of file fragments on the cloud platform caused by resource allocation imbalance of the host machine can be alleviated, thereby improving the resource allocation ratio of the host machine and saving resources. On the other hand, the load of the host machine on the cloud platform can be maintained to prevent some host machines from having a high load/a low load, thereby maintaining stable operation of the cloud platform.

Figure 15:
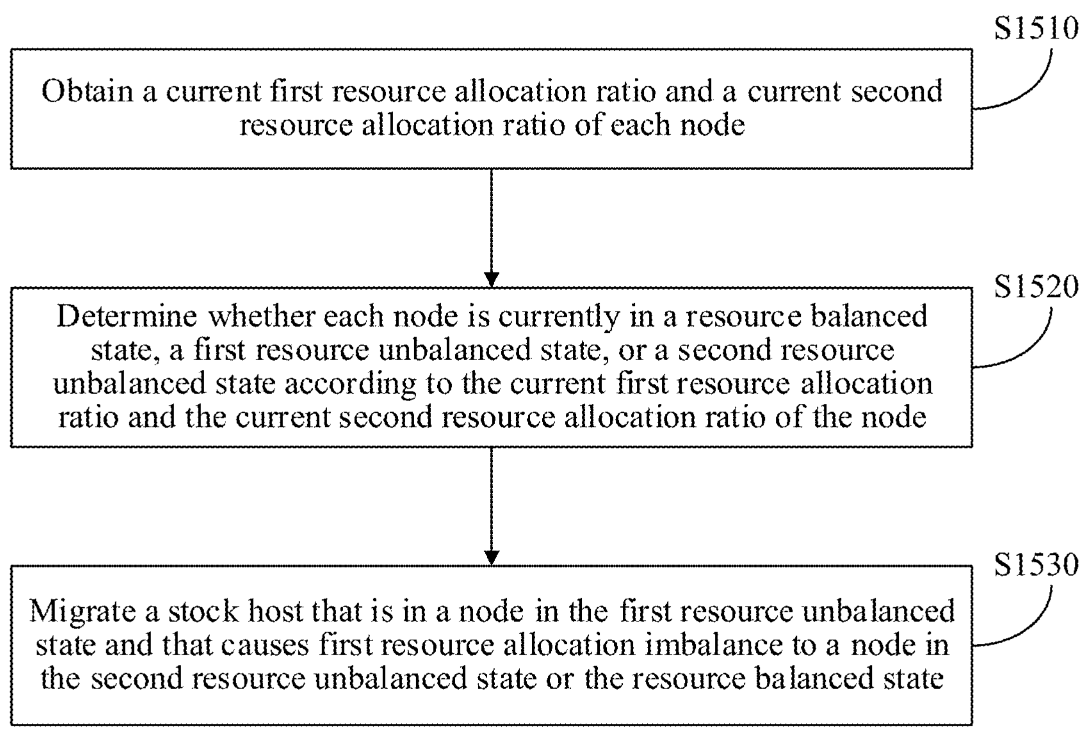
FIG. 15 is a schematic flowchart of a method for processing a cloud platform resource fragment according to still another embodiment of the present disclosure.

FIG. 15 is a schematic flowchart of a method for processing a cloud platform resource fragment according to still another embodiment of the present disclosure. The cloud platform may include a plurality of nodes, and each node may include a first resource and a second resource.

As shown in FIG. 15, the method for processing a cloud platform resource fragment provided in this embodiment of the present disclosure may include the following steps.

Step S1510: Obtain a current first resource allocation ratio and a current second resource allocation ratio of each node.

Step S1520: Determine whether each node is currently in a resource balanced state, a first resource unbalanced state, or a second resource unbalanced state according to the current first resource allocation ratio and the current second resource allocation ratio of the node.

In an exemplary embodiment, the determining whether each node is currently in a resource balanced state, a first resource unbalanced state, or a second resource unbalanced state according to the current first resource allocation ratio and the current second resource allocation ratio of the node may include: normalizing the current first resource allocation ratio and the current second resource allocation ratio of the node; and determining that the node is currently in the first resource unbalanced state in accordance with a determination that a distance between the current first resource allocation ratio and the current second resource allocation ratio of the node after the normalization and a first circle center or a second circle center is greater than or equal to a first radius, and the current first resource allocation ratio is greater than the current second resource allocation ratio after the normalization, or in accordance with a determination that the current first resource allocation ratio of the node is greater than a second radius after the normalization, and the current second resource allocation ratio is less than the second radius.

In an exemplary embodiment, the determining whether each node is currently in a resource balanced state, a first resource unbalanced state, or a second resource unbalanced state according to the current first resource allocation ratio and the current second resource allocation ratio of the node may further include: determining that the node is currently in the second resource unbalanced state in accordance with a determination that the distance between the current first resource allocation ratio and the current second resource allocation ratio of the node after the normalization and the first circle center or the second circle center is greater than or equal to the first radius, and the current first resource allocation ratio after the normalization is less than the current second resource allocation ratio, or in accordance with a determination that the current first resource allocation ratio of the node after the normalization is less than the second radius, and the current second resource allocation ratio is greater than the second radius.

Step S1530: Migrate a stock host from a node in the first resource unbalanced state that causes first resource allocation imbalance to a node in the second resource unbalanced state or the resource balanced state.

In an exemplary embodiment, the migrating a stock host from a node in the first resource unbalanced state that causes first resource allocation imbalance to a node in the second resource unbalanced state or the resource balanced state may include: calculating a first resource imbalance degree of each node in the first resource unbalanced state; determining a first resource node having the highest first resource imbalance degree; and migrating a stock host from the first resource node that causes first resource allocation imbalance to a node in the second resource unbalanced state.

In an exemplary embodiment, the migrating a stock host from the first resource node that causes first resource allocation imbalance to a node in the second resource unbalanced state may include: determining, in accordance with a determination that a ratio of a first resource quota to a second resource quota of a stock host in the first resource node is greater than a ratio of the current first resource allocation ratio to the current second resource allocation ratio of the first resource node, the stock host as a stock host that causes first resource allocation imbalance of the first resource node; sorting, in descending order of the first resource quota, the stock hosts in the first resource node that cause first resource allocation imbalance; and sequentially traversing the stock hosts sorted in descending order, and migrating the stock hosts to the node in the second resource unbalanced state.

For a specific implementation in this embodiment of the present disclosure, refer to the foregoing embodiments.

In the method for processing a cloud platform resource fragment provided in this implementation of the present disclosure, post-adjustment is performed on the resource allocation status of each node on the cloud platform. Stock host scheduling is performed on nodes in resource imbalance point to point, to implement directional migration and mutual migration of stock hosts between host machines in resource imbalance. The post-adjustment is targeted, the adjustment efficiency is high, and resource allocation balance is implemented in relatively few migrations.

In an exemplary embodiment, the sequentially traversing the stock hosts sorted in descending order, and migrating the stock hosts to the node in the second resource unbalanced state may include: obtaining first resource utilization rates of the stock hosts sorted in descending order; and migrating, in accordance with a determination that the first resource utilization rate of a stock host is less than a first threshold, the stock host to a node that is in the second resource unbalanced state and whose first resource utilization rate is greater than or equal to a second threshold.

In an exemplary embodiment, the sequentially traversing the stock hosts sorted in descending order, and migrating the stock hosts to the node in the second resource unbalanced state may further include: migrating, in accordance with a determination that the first resource utilization rate of a stock host is greater than a third threshold, the stock host to a node that is in the second resource unbalanced state and whose first resource utilization rate is greater than or equal to a fourth threshold, the first threshold being less than the third threshold, and the second threshold being less than the fourth threshold.

In the method for processing a cloud platform resource fragment provided in this implementation of the present disclosure, more dimensions are considered for balance of the host machine. Both the resource allocation status and the load status of the host machine are taken into account, thereby optimizing the utilization efficiency of cloud platform resources.

Figure 16:
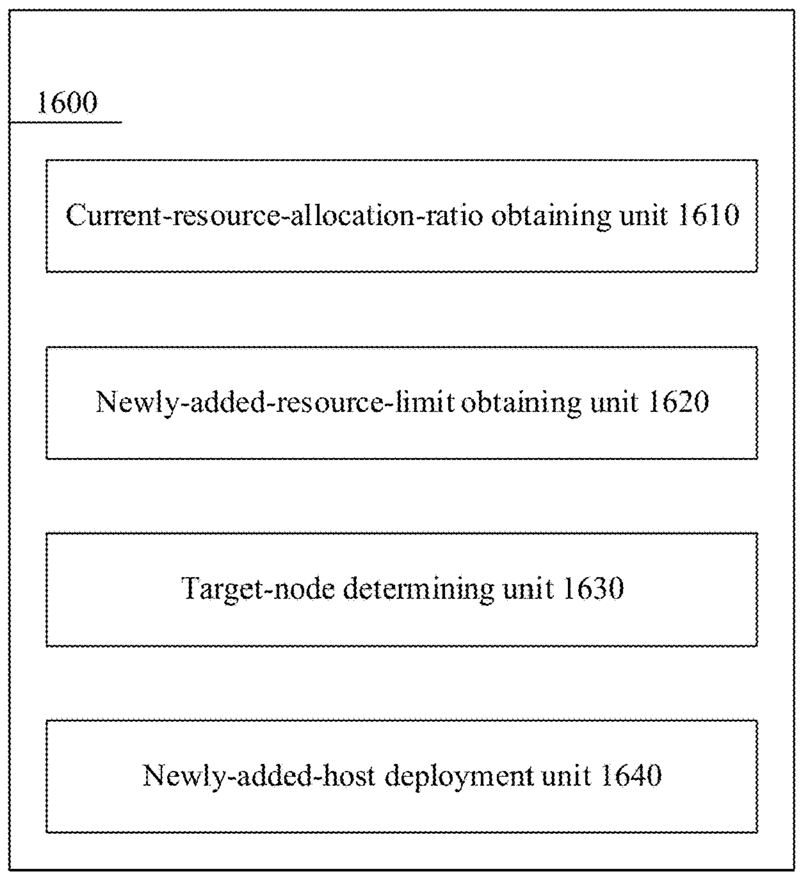
FIG. 16 is a schematic block diagram of an apparatus for processing a cloud platform resource fragment according to an embodiment of the present disclosure.

FIG. 16 is a schematic block diagram of an apparatus for processing a cloud platform resource fragment according to an embodiment of the present disclosure. The cloud platform may include a plurality of nodes, and each node may include a first resource and a second resource.

As shown in FIG. 16, an apparatus 1600 for processing a cloud platform resource fragment provided in this implementation of the present disclosure may include a current-resource-allocation-ratio obtaining unit 1610, a newly-added-resource-limit obtaining unit 1620, a target-node determining unit 1630, and a newly-added-host deployment unit 1640. In this application, the term "unit" or "module" refers to a computer program or part of the computer program that has a predefined function and works together with other related parts to achieve a predefined goal and may be all or partially implemented by using software, hardware (e.g., processing circuitry and/or memory configured to perform the predefined functions), or a combination thereof. Each unit or module can be implemented using one or more processors (or processors and memory). Likewise, a processor (or processors and memory) can be used to implement one or more modules or units. Moreover, each module or unit can be part of an overall module that includes the functionalities of the module or unit.

The current-resource-allocation-ratio obtaining unit 1610 may be configured to obtain a current first resource allocation ratio and a current second resource allocation ratio of each node. The newly-added-resource-limit obtaining unit 1620 may be configured to obtain a first resource limit and a second resource limit that are required by a newly added host. The target-node determining unit 1630 may be configured to determine a target node according to the current first resource allocation ratio and the current second resource allocation ratio of each node, the first resource limit, and the second resource limit. The newly-added-host deployment unit 1640 may be configured to deploy the newly added host in the target node.

In an exemplary embodiment, the apparatus 1600 for processing a cloud platform resource fragment may further include: a resource-margin obtaining unit that may be configured to obtain a current first resource margin and a current second resource margin of each node; and a candidate-node determining unit that may be configured to determine candidate nodes in the nodes according to the current first resource margin and the current second resource margin of each node, and the first resource limit and the second resource limit that are required by the newly added host.

In an exemplary embodiment, the apparatus 1600 for processing a cloud platform resource fragment may further include: a node-current-load obtaining unit that may be configured to obtain a current first resource utilization rate of each candidate node; a host-current-load obtaining unit that may be configured to obtain a current first resource utilization rate of the newly added host; a node-updated-load obtaining unit that may be configured to calculate an updated first resource utilization rate of each candidate node according to the current first resource utilization rate of each candidate node and the current first resource utilization rate of the newly added host; and a target-candidate-node determining unit that may be configured to determine the target candidate nodes in the candidate nodes according to the updated first resource utilization rate of each candidate node.

In an exemplary embodiment, the target-node determining unit 1630 may include: a current-resource-imbalance-degree obtaining unit that may be configured to obtain a current resource imbalance degree of each target candidate node according to the current first resource allocation ratio and the current second resource allocation ratio of the target candidate node; an updated-resource-allocation-ratio calculation unit that may be configured to calculate an updated first resource allocation ratio and an updated second resource allocation ratio of each target candidate node according to the first resource limit and the second resource limit; and an updated-resource-imbalance-degree calculation unit that may be configured to calculate an updated resource imbalance degree of each target candidate node according to the updated first resource allocation ratio and the updated second resource allocation ratio of the target candidate node. The target-node determining unit 1530 may be configured to determine the target node according to the current resource imbalance degree and the updated resource imbalance degree of each target candidate node.

In an exemplary embodiment, the target-node determining unit 1530 may be further configured to obtain a resource imbalance alleviation degree of each target candidate node according to the current resource imbalance degree and the updated resource imbalance degree of the target candidate node; and use a target candidate node having the highest resource imbalance alleviation degree as the target node of the newly added host.

In an exemplary embodiment, the apparatus 1600 for processing a cloud platform resource fragment may further include: a node-resource-allocation-state determining unit that may be configured to determine whether each node is currently in a resource balanced state, a first resource unbalanced state, or a second resource unbalanced state according to the current first resource allocation ratio and the current second resource allocation ratio of the node; and a stock-host directional-migration unit that may be configured to migrate a stock host from a node in the first resource unbalanced state that causes first resource allocation imbalance to a node in the second resource unbalanced state or the resource balanced state.

In an exemplary embodiment, the stock-host directional-migration unit may include: a first resource imbalance degree calculation unit that may be configured to calculate a first resource imbalance degree of each node in the first resource unbalanced state; and a first-resource-node determining unit that may be configured to determine a first resource node having the highest first resource imbalance degree. The stock-host directional-migration unit may be configured to migrate a stock host from the first resource node that causes first resource allocation imbalance to a node in the second resource unbalanced state.

In an exemplary embodiment, the stock-host directional-migration unit may further include: a stock-host determining unit that may be configured to determine, in accordance with a determination that a ratio of a first resource quota to a second resource quota of a stock host in the first resource node is greater than a ratio of the current first resource allocation ratio to the current second resource allocation ratio of the first resource node, the stock host as a stock host that causes first resource allocation imbalance of the first resource node; a stock-host sorting unit that may be configured to sort, in descending order of the first resource quota, the stock hosts in the first resource node that cause first resource allocation imbalance; and a stock-host sequential-migration unit that may be configured to sequentially traverse the stock hosts sorted in descending order, and migrate the stock hosts to the node in the second resource unbalanced state.

In an exemplary embodiment, the stock-host sequential-migration unit may include: a first-resource-utilization-rate obtaining unit that may be configured to obtain first resource utilization rates of the stock hosts sorted in descending order; and a stock-host-balance scheduling unit that may be configured to migrate, in accordance with a determination that the first resource utilization rate of a stock host is less than a first threshold, the stock host to a node that is in the second resource unbalanced state and whose first resource utilization rate is greater than or equal to a second threshold.

In an exemplary embodiment, the stock-host sequential-migration unit may further include: a stock-host-balancing scheduling unit that may be configured to migrate, in accordance with a determination that the first resource utilization rate of a stock host is greater than a third threshold, the stock host to a node that is in the second resource unbalanced state and whose first resource utilization rate is greater than or equal to a fourth threshold. The first threshold is less than the third threshold, and the second threshold is less than the fourth threshold.

Figure 17:
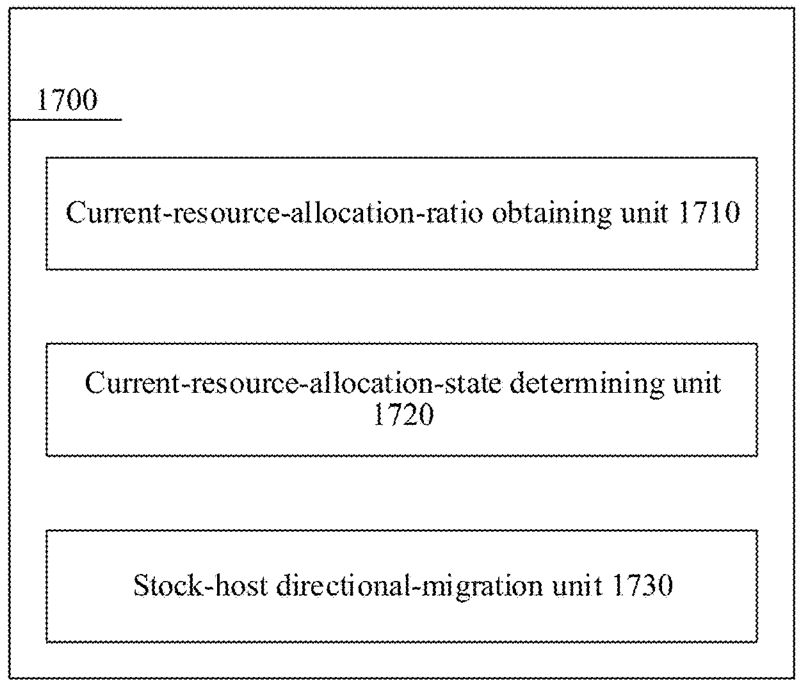
FIG. 17 is a schematic block diagram of an apparatus for processing a cloud platform resource fragment according to another embodiment of the present disclosure.

FIG. 17 is a schematic block diagram of an apparatus for processing a cloud platform resource fragment according to another embodiment of the present disclosure. The cloud platform may include a plurality of nodes, and each node may include a first resource and a second resource.

As shown in FIG. 17, an apparatus 1700 for processing a cloud platform resource fragment provided in this implementation of the present disclosure may include a current-resource-allocation-ratio obtaining unit 1710, a current-resource-allocation-state determining unit 1720, and a stock-host directional-migration unit 1730.

The current-resource-allocation-ratio obtaining unit 1710 may be configured to obtain a current first resource allocation ratio and a current second resource allocation ratio of each node. The current-resource-allocation-state determining unit 1720 may be configured to determine whether each node is currently in a resource balanced state, a first resource unbalanced state, or a second resource unbalanced state according to the current first resource allocation ratio and the current second resource allocation ratio of the node. The stock-host directional-migration unit 1730 may be configured to migrate a stock host from a node in the first resource unbalanced state that causes first resource allocation imbalance to a node in the second resource unbalanced state or the resource balanced state.

In an exemplary embodiment, the current-resource-allocation-state determining unit 1720 may include: a resource-allocation-ratio normalization unit that may be configured to normalize the current first resource allocation ratio and the current second resource allocation ratio of each node; and a first-resource-unbalanced-state determining unit that may be configured to determine that the node is currently in the first resource unbalanced state in accordance with a determination that a distance between the current first resource allocation ratio and the current second resource allocation ratio of the node after the normalization and a first circle center or a second circle center is greater than or equal to a first radius, and the current first resource allocation ratio is greater than the current second resource allocation ratio after the normalization, or in accordance with a determination that the current first resource allocation ratio of the node is greater than a second radius after the normalization, and the current second resource allocation ratio is less than the second radius.

In an exemplary embodiment, the current-resource-allocation-state determining unit 1720 may further include: a second-resource-unbalanced-state determining unit that may be configured to determine that the node is currently in the second resource unbalanced state in accordance with a determination that the distance between the current first resource allocation ratio and the current second resource allocation ratio of the node after the normalization and the first circle center or the second circle center is greater than or equal to the first radius, and the current first resource allocation ratio after the normalization is less than the current second resource allocation ratio, or in accordance with a determination that the current first resource allocation ratio of the node after the normalization is less than the second radius, and the current second resource allocation ratio is greater than the second radius.

In an exemplary embodiment, the stock-host directional-migration unit 1730 may include: a first-resource-imbalance-degree calculation unit that may be configured to calculate a first resource imbalance degree of each node in the first resource unbalanced state; and a first-resource-node determining unit that may be configured to determine a first resource node having the highest first resource imbalance degree. The stock-host directional-migration unit 1730 may be configured to migrate a stock host from the first resource node that causes first resource allocation imbalance to a node in the second resource unbalanced state.

In an exemplary embodiment, the stock-host directional-migration unit 1730 may further include: a stock-host determining unit that may be configured to determine, in accordance with a determination that a ratio of a first resource quota to a second resource quota of a stock host in the first resource node is greater than a ratio of the current first resource allocation ratio to the current second resource allocation ratio of the first resource node, the stock host as a stock host that causes first resource allocation imbalance of the first resource node; a stock-host sorting unit that may be configured to sort, in descending order of the first resource quota, the stock hosts in the first resource node that cause first resource allocation imbalance; and a stock-host sequential-migration unit that may be configured to sequentially traverse the stock hosts sorted in descending order, and migrate the stock hosts to the node in the second resource unbalanced state.

In an exemplary embodiment, the stock-host sequential-migration unit may include: a first-resource-utilization-rate obtaining unit that may be configured to obtain first resource utilization rates of the stock hosts sorted in descending order; and a stock-host-balance scheduling unit that may be configured to migrate, in accordance with a determination that the first resource utilization rate of a stock host is less than a first threshold, the stock host to a node that is in the second resource unbalanced state and whose first resource utilization rate is greater than or equal to a second threshold.

In an exemplary embodiment, the stock-host sequential-migration unit may further include: a stock-host-balancing scheduling unit that may be configured to migrate, in accordance with a determination that the first resource utilization rate of a stock host is greater than a third threshold, the stock host to a node that is in the second resource unbalanced state and whose first resource utilization rate is greater than or equal to a fourth threshold. The first threshold is less than the third threshold, and the second threshold is less than the fourth threshold.

For specific implementations of the units in the apparatus for processing a cloud platform resource fragment provided in this embodiment of the present disclosure, reference may be made to the content in the foregoing method for processing a cloud platform resource fragment, and details are not described herein again.

Although a plurality of units of a device configured to perform actions are discussed in the foregoing detailed description, such division is not mandatory. In fact, according to the implementations of the present disclosure, the features and functions of two or more units described above may be embodied in one unit. On the contrary, the features and functions of one unit described above may be further divided into a plurality of units to be specified.

Through descriptions of the foregoing implementations, a person skilled in the art may easily understand that the exemplary implementations described herein may be implemented by using software, or may be implemented by using software in combination with necessary hardware. Therefore, the technical solutions according to the implementations of the present disclosure may be implemented in the form of a software product. The software product may be stored in a non-volatile storage medium (which may be a CD-ROM, a USB flash drive, a removable hard disk, or the like) or a network, and includes several instructions for instructing a computing device (which may be a personal computer, a server, a touch terminal, a network device, or the like) to perform the method according to the implementations of the present disclosure.

After considering the specification and practicing the present disclosure, a person skilled in the art would easily conceive of other implementations of the present disclosure. This application is intended to cover any variation, use, or adaptive change of the present disclosure. These variations, uses, or adaptive changes follow the general principles of the present disclosure and include common general knowledge or common technical means, which are not disclosed in the present disclosure, in the technology. The specification and the embodiments are considered as exemplary only, and a true scope and spirit of the present disclosure are pointed out by the following claims.

The present disclosure is not limited to the precise structures described above and shown in the accompanying drawings, and various modifications and changes can be made without departing from the scope of the present disclosure. The scope of the present disclosure is limited only by the appended claims.

What is claimed is:

1. A resource processing method of a cloud platform, the cloud platform comprising a plurality of nodes, each node comprising a first resource and a second resource different from the first resource, the method being performed by a computing device in the cloud platform, and the method comprising:

obtaining a current first resource allocation ratio and a current second resource allocation ratio of each of the plurality of nodes;

obtaining a first resource limit and a second resource limit that are required by a newly added host;

determining, among the plurality of nodes, a target node according to the current first resource allocation ratio and the current second resource allocation ratio of each node, the first resource limit, and the second resource limit;

deploying the newly added host in the target node;

determining a current state of each node according to the current first resource allocation ratio and the current second resource allocation ratio of the node, the current state indicating whether there is an inter-resource balance between usage of the first resource and the second resource at different nodes and the current state being one of three states: a resource balanced state, a first resource unbalanced state, or a second resource unbalanced state that is opposite to the first resource unbalanced state, wherein the first resource and the second resource are different types of resources; and migrating a stock host from a node in the first resource unbalanced state that causes first resource allocation imbalance to a node in the second resource unbalanced state or the resource balanced state.

2. The method according to claim 1, wherein after the obtaining a first resource limit and a second resource limit that are required by a newly added host, the method further comprises:

obtaining a current first resource margin and a current second resource margin of each node, the current first resource margin being the first resource of the entire node minus a sum of partial first resources allocated by the node to stock hosts deployed in the node, and the current second resource margin being the second resource of the entire node minus a sum of partial second resources allocated by the node to the stock hosts deployed in the node;

determining candidate nodes in the plurality of nodes according to the current first resource margin and the current second resource margin of each node, and the first resource limit and the second resource limit that are required by the newly added host; and selecting target candidate nodes from the determined candidate nodes.

3. The method according to claim 2, wherein the determining candidate nodes in the nodes according to the current first resource margin and the current second resource margin of each node, and the first resource limit and the second resource limit that are required by the newly added host comprises:

determining a node as a candidate node in the plurality of nodes in accordance with a determination that the current first resource margin of the node is greater than or equal to the first resource limit required by the newly added host, and the current second resource margin of the node is greater than or equal to the second resource limit required by the newly added host.

4. The method according to claim 2, wherein the selecting target candidate nodes from the determined candidate nodes further comprises:

obtaining a current first resource utilization rate of each candidate node;

obtaining a current first resource utilization rate of the newly added host;

calculating an updated first resource utilization rate of each candidate node according to the current first resource utilization rate of the candidate node and the current first resource utilization rate of the newly added host;

determining the target candidate nodes among the candidate nodes according to the updated first resource utilization rate of each candidate node; and identifying one target node in the determined target candidate nodes as the target node.

5. The method according to claim 4, wherein the determining the target candidate nodes among the candidate nodes according to the updated first resource utilization rate of each candidate node comprises:

determining, in accordance with a determination that the updated first resource utilization rate of a candidate node in the candidate nodes is less than or equal to a specified high load threshold, the candidate node as a target candidate node in the candidate nodes.

6. The method according to claim 4, wherein the determining, among the plurality of nodes, a target node according to the current first resource allocation ratio and the current second resource allocation ratio of each node, the first resource limit, and the second resource limit comprises:

obtaining a current resource imbalance degree of each target candidate node according to the current first resource allocation ratio and the current second resource allocation ratio of the target candidate node, the current resource imbalance degree being used for measuring a degree of difference between the first resource allocation ratio and the second resource allocation ratio of the target candidate node;

calculating an updated first resource allocation ratio and an updated second resource allocation ratio of each target candidate node according to the first resource limit and the second resource limit;

calculating an updated resource imbalance degree of each target candidate node according to the updated first resource allocation ratio and the updated second resource allocation ratio of the target candidate node, the updated resource imbalance degree being used for measuring a degree of difference between the updated first resource allocation ratio and the updated second resource allocation ratio of the target candidate node; and determining the target node according to the current resource imbalance degree and the updated resource imbalance degree of each target candidate node.

7. The method according to claim 6, wherein the determining the target node according to the current resource imbalance degree and the updated resource imbalance degree of each target candidate node comprises:

obtaining a resource imbalance alleviation degree of each target candidate node according to the current resource imbalance degree and the updated resource imbalance degree of the target candidate node; and using a target candidate node having the highest resource imbalance alleviation degree as the target node of the newly added host.

8. The method according to claim 1, wherein the migrating a stock host from a node in the first resource unbalanced state that causes first resource allocation imbalance to a node in the second resource unbalanced state or the resource balanced state comprises:

calculating a first resource imbalance degree of each node in the first resource unbalanced state;

determining a first resource node having the highest first resource imbalance degree; and migrating a stock host from the first resource node that causes first resource allocation imbalance to a node in the second resource unbalanced state.

9. The method according to claim 8, wherein the migrating a stock host from the first resource node that causes first resource allocation imbalance to a node in the second resource unbalanced state comprises:

determining, in accordance with a determination that a ratio of a first resource quota to a second resource quota of a stock host in the first resource node is greater than a ratio of the current first resource allocation ratio to the current second resource allocation ratio of the first resource node, the stock host as a stock host that causes first resource allocation imbalance of the first resource node;

sorting, in descending order of the first resource quota, the stock hosts in the first resource node that cause first resource allocation imbalance; and sequentially traversing the stock hosts sorted in descending order, and migrating the stock hosts to the node in the second resource unbalanced state.

10. The method according to claim 9, wherein the sequentially traversing the stock hosts sorted in descending order, and migrating the stock hosts to the node in the second resource unbalanced state comprises:

obtaining first resource utilization rates of the stock hosts sorted in descending order; and migrating, in accordance with a determination that the first resource utilization rate of a stock host is less than a first threshold, the stock host to a node that is in the second resource unbalanced state and whose first resource utilization rate is greater than or equal to a second threshold.

11. The method according to claim 10, wherein the sequentially traversing the stock hosts sorted in descending order, and migrating the stock hosts to the node in the second resource unbalanced state further comprises:

migrating, in accordance with a determination that the first resource utilization rate of a stock host is greater than a third threshold, the stock host to a node that is in the second resource unbalanced state and whose first resource utilization rate is greater than or equal to a fourth threshold, the first threshold being less than the third threshold, and the second threshold being less than the fourth threshold.

12. A computing device configured to implement a resource processing method of a cloud platform, the cloud platform comprising a plurality of nodes, each node comprising a first resource and a second resource different from the first resource, the computing device comprising:

one or more processors; and a storage apparatus, configured to store one or more programs, the one or more programs, when executed by the one or more processors, causing the one or more processors to implement a plurality of operations including:

obtaining a current first resource allocation ratio and a current second resource allocation ratio of each of the plurality of nodes;

obtaining a first resource limit and a second resource limit that are required by a newly added host;

determining, among the plurality of nodes, a target node according to the current first resource allocation ratio and the current second resource allocation ratio of each node, the first resource limit, and the second resource limit;

deploying the newly added host in the target node;

determining a current state of each node according to the current first resource allocation ratio and the current second resource allocation ratio of the node, the current state indicating whether there is an inter-resource balance between usage of the first resource and the second resource at different nodes and the current state being one of three states: a resource balanced state, a first resource unbalanced state, or a second resource unbalanced state that is opposite to the first resource unbalanced state, wherein the first resource and the second resource are different types of resources; and migrating a stock host from a node in the first resource unbalanced state that causes first resource allocation imbalance to a node in the second resource unbalanced state or the resource balanced state.

13. The computing device according to claim 12, wherein after the obtaining a first resource limit and a second resource limit that are required by a newly added host, the plurality of operations further comprise:

obtaining a current first resource margin and a current second resource margin of each node, the current first resource margin being the first resource of the entire node minus a sum of partial first resources allocated by the node to stock hosts deployed in the node, and the current second resource margin being the second resource of the entire node minus a sum of partial second resources allocated by the node to the stock hosts deployed in the node;

determining candidate nodes in the plurality of nodes according to the current first resource margin and the current second resource margin of each node, and the first resource limit and the second resource limit that are required by the newly added host; and selecting target candidate nodes from the determined candidate nodes.

14. The computing device according to claim 13, wherein the determining candidate nodes in the nodes according to the current first resource margin and the current second resource margin of each node, and the first resource limit and the second resource limit that are required by the newly added host comprises:

determining a node as a candidate node in the plurality of nodes in accordance with a determination that the current first resource margin of the node is greater than or equal to the first resource limit required by the newly added host, and the current second resource margin of the node is greater than or equal to the second resource limit required by the newly added host.

15. The computing device according to claim 13, wherein the selecting target candidate nodes from the determined candidate nodes further comprises:

obtaining a current first resource utilization rate of each candidate node;

obtaining a current first resource utilization rate of the newly added host;

calculating an updated first resource utilization rate of each candidate node according to the current first resource utilization rate of the candidate node and the current first resource utilization rate of the newly added host;

determining the target candidate nodes among the candidate nodes according to the updated first resource utilization rate of each candidate node; and identifying one target node in the determined target candidate nodes as the target node.

16. The computing device according to claim 12, wherein the migrating a stock host from a node in the first resource unbalanced state that causes first resource allocation imbalance to a node in the second resource unbalanced state or the resource balanced state comprises:

calculating a first resource imbalance degree of each node in the first resource unbalanced state;

determining a first resource node having the highest first resource imbalance degree; and migrating a stock host from the first resource node that causes first resource allocation imbalance to a node in the second resource unbalanced state.

17. A non-transitory computer-readable storage medium, storing a plurality of computer programs configured to implement a resource processing method of a cloud platform, the cloud platform comprising a plurality of nodes, each node comprising a first resource and a second resource different from the first resource, the computer programs, when executed by a processor of a computing device, implementing a plurality of operations including:

obtaining a current first resource allocation ratio and a current second resource allocation ratio of each of the plurality of nodes;

obtaining a first resource limit and a second resource limit that are required by a newly added host;

determining, among the plurality of nodes, a target node according to the current first resource allocation ratio and the current second resource allocation ratio of each node, the first resource limit, and the second resource limit;

deploying the newly added host in the target node;

determining a current state of each node according to the current first resource allocation ratio and the current second resource allocation ratio of the node, the current state indicating whether there is an inter-resource balance between usage of the first resource and the second resource at different nodes and the current state being one of three states: a resource balanced state, a first resource unbalanced state, or a second resource unbalanced state that is opposite to the first resource unbalanced state, wherein the first resource and the second resource are different types of resources; and migrating a stock host from a node in the first resource unbalanced state that causes first resource allocation imbalance to a node in the second resource unbalanced state or the resource balanced state.

18. The non-transitory computer-readable storage medium according to claim 17, wherein after the obtaining a first resource limit and a second resource limit that are required by a newly added host, the plurality of operations further comprise:

obtaining a current first resource margin and a current second resource margin of each node, the current first resource margin being the first resource of the entire node minus a sum of partial first resources allocated by the node to stock hosts deployed in the node, and the current second resource margin being the second resource of the entire node minus a sum of partial second resources allocated by the node to the stock hosts deployed in the node;

determining candidate nodes in the plurality of nodes according to the current first resource margin and the current second resource margin of each node, and the first resource limit and the second resource limit that are required by the newly added host; and selecting target candidate nodes from the determined candidate nodes.

19. The non-transitory computer-readable storage medium according to claim 18, wherein the determining candidate nodes in the nodes according to the current first resource margin and the current second resource margin of each node, and the first resource limit and the second resource limit that are required by the newly added host comprises:

determining a node as a candidate node in the plurality of nodes in accordance with a determination that the current first resource margin of the node is greater than or equal to the first resource limit required by the newly added host, and the current second resource margin of the node is greater than or equal to the second resource limit required by the newly added host.

20. The non-transitory computer-readable storage medium according to claim 17, wherein the migrating a stock host from a node in the first resource unbalanced state that causes first resource allocation imbalance to a node in the second resource unbalanced state or the resource balanced state comprises:

calculating a first resource imbalance degree of each node in the first resource unbalanced state;

determining a first resource node having the highest first resource imbalance degree; and migrating a stock host from the first resource node that causes first resource allocation imbalance to a node in the second resource unbalanced state.

* * * * *